(12) United States Patent
Hagihara

(10) Patent No.: US 8,669,898 B2
(45) Date of Patent: Mar. 11, 2014

(54) RAMP WAVE GENERATION CIRCUIT AND SOLID-STATE IMAGING DEVICE

(71) Applicant: Olympus Corporation, Tokyo (JP)

(72) Inventor: Yoshio Hagihara, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/626,533

(22) Filed: Sep. 25, 2012

(65) Prior Publication Data

US 2013/0075589 A1 Mar. 28, 2013

(30) Foreign Application Priority Data

Sep. 26, 2011 (JP) ................................. 2011-208976

(51) Int. Cl.
*H03M 1/56* (2006.01)

(52) U.S. Cl.
USPC ............................................ 341/169; 326/41

(58) Field of Classification Search
USPC ................................. 341/155, 169
See application file for complete search history.

(56) References Cited

U.S. PATENT DOCUMENTS 6,002,268 A * 12/1999 Sasaki et al. ..................... 326/41
7,782,017 B2 * 8/2010 Hack et al. ..................... 320/132

FOREIGN PATENT DOCUMENTS

JP 2002-158933 A 5/2002

* cited by examiner

*Primary Examiner* — Jean B Jeanglaude
(74) *Attorney, Agent, or Firm* — Westerman, Hattori, Daniels & Adrian, LLP

(57) ABSTRACT

Provided are a ramp wave generation circuit and a solid-state imaging device in which a pulse output unit includes a delay part including a plurality of delay units that delay and output an input signal, and a delay control part that controls a delay time by which the delay unit delays the signal, and outputs a plurality of signals having logic states corresponding to logic states of signals output by the delay units, a time difference between timings at which the logic states of the respective signals are changed being a time corresponding to the delay time.

5 Claims, 20 Drawing Sheets

US 8,669,898 B2

RAMP WAVE GENERATION CIRCUIT AND SOLID-STATE IMAGING DEVICE

BACKGROUND OF THE INVENTION

1. Field of the Invention

The present invention relates to a ramp wave generation circuit that generates a ramp wave having a voltage value which increases or decreases over time, and a solid-state imaging device including the ramp wave generation circuit.

This application claims the benefits of Japanese Patent Application No. 2011-208976, filed Sep. 26, 2011, the disclosure of which is hereby incorporated herein by reference in its entirety.

2. Description of Related Art

FIG. 20 illustrates an example of a configuration of a solid-state imaging device with an ADC (Analog-Digital converter) in each pixel column.

A solid-state imaging device 1 illustrated in FIG. 20 includes an imaging unit 2, a row scanning circuit 3, a column scanning circuit 4, a timing control circuit 5, an ADC group 6, a ramp wave generation circuit 7, a counter 8, and a data output circuit 9 including a sense amplifier circuit.

In the imaging unit 2, unit pixels 20 each including a photodiode and an in-pixel amplifier and outputting a pixel signal according to an amount of an incident electromagnetic wave are arranged in a matrix shape. The timing control circuit 5 is a control circuit for sequentially reading the pixel signals from the imaging unit 2. The row scanning circuit 3 performs control of a row address or row scanning of the imaging unit 2 via a row control line 21. The column scanning circuit 4 performs control of a column address or column scanning of the ADC group 6. The ramp wave generation circuit 7 generates a ramp wave having a voltage value which increases or decreases over time.

The ADC group 6 has an n-bit digital signal conversion function, and includes a column ADC unit 60 provided in a vertical signal line 22 corresponding to each pixel column. The column ADC unit 60 includes a comparator 601 and a latch unit 602. The comparator 601 compares the ramp wave generated by the ramp wave generation circuit 7 with an analog signal obtained from the unit pixel 20 via each vertical signal line 22 for each row control line 21. The latch unit 602 includes latch circuits 603 and 604 that hold a counting result of the counter 8, which counts a comparison time. An output of each latch unit 602 is connected to a horizontal transfer line 117 having a 2n-bit width. The data output circuit 9 includes 2n sense circuits corresponding to the respective horizontal transfer lines 117.

Next, an operation of the solid-state imaging device 1 will be described. From each unit pixel 20 on a selected row of the imaging unit 2, as an analog pixel signal, a reset level containing noise of a pixel signal is read in a first reading operation and then a signal level is read in a second reading operation. Also, the reset level and the signal level are input to the ADC group 6 via the vertical signal line 22 in chronological order.

After first reading from the unit pixel 20 of any row to the vertical signal line 22 is stabilized, a ramp wave obtained by changing a reference voltage in terms of time is generated by the ramp wave generation circuit 7 and is input to the comparator 601. The comparator 601 compares the voltage of any vertical signal line 22 with the ramp wave. First counting is performed by the counter 8 when the ramp wave is input to the comparator 601.

When the voltage level of the ramp wave and the voltage of any vertical signal line 22 become the same, the output of the comparator 601 is inverted, and simultaneously a count value corresponding to the comparison period is held in the latch unit 602. In the first reading, since variation in the reset level of the unit pixel 20 is generally small and the reset voltage is common to all pixels, the output of any vertical signal line 22 is substantially the same as a known value. Accordingly, in a first reading of the reset level, the comparison period may be shortened by appropriately adjusting the voltage of the ramp wave.

In second reading, a signal level corresponding to an incident light amount of each unit pixel 20 is read in addition to the reset level, and an operation similar to the first reading is performed. In other words, after second reading from the unit pixel 20 of any row to any vertical signal line 22 is stabilized, the ramp wave obtained by changing a reference voltage in terms of time is generated by the ramp wave generation circuit 7 and is input to the comparator 601.

The comparator 601 compares the voltage of any vertical signal line 22 with the ramp wave. Second counting is performed by the counter 8 when the ramp wave is input to the comparator 601.

When the voltage level of the ramp wave and the voltage of any vertical signal line 22 become the same, an output of the comparator 601 is inverted and simultaneously a count value corresponding to the comparison period is held in the latch unit 602. A first count value is held, for example, in the latch circuit 603, and a second count value is held, for example, in the latch circuit 604.

After the two reading operations end, the first and second n-bit digital signals held in the latch unit 602 are detected by the data output circuit 9 via the 2n horizontal transfer lines 117 according to the column scanning circuit 4. Then, in a subtraction circuit, the signal obtained in the first reading is sequentially subtracted from the signal obtained in the second reading, and then a resultant signal is output to the outside. Then, sequentially, a similar operation is repeatedly performed for the respective rows to generate a two-dimensional image.

A scanning circuit that can be applied to a solid-state imaging device is described in Japanese Unexamined Patent Application, First Publication No. 2002-158933.

SUMMARY OF THE INVENTION

A first aspect of the present invention is a ramp wave generation circuit including a pulse output unit having a delay part having a plurality of delay units that delay and output an input signal, and a delay control part controlling a delay time by which the delay unit delays a signal, wherein the pulse output unit outputs a plurality of signals having logic states corresponding to logic states of signals output by the delay units and a time corresponding to the delay time that a time difference between timings at which the logic states of the respective signals are changed is, m (m is a natural number greater than or equal to 2) functional circuits including an upper current source cell part having upper current source cells that generate a same constant current, a lower current source cell part including a plurality of lower current source cells weighted to generate a current value different by a predetermined percentage from a current value of the constant current generated by the upper current source cell, a lower bit selection part selecting the lower current source cell based on an output of the pulse output unit, and an upper bit selection part selecting the upper current source cell based on an output of the pulse output unit, an addition unit adding currents output from the m functional circuits, and a conversion unit converting an current added by the addition unit into a voltage and outputting the voltage, wherein a time difference between a timing of a selection operation of the lower bit selection part and the upper bit selection part had in one functional circuit in the m functional circuits and a timing of a selection operation of the lower bit selection part and the upper bit selection part had in the other functional circuit in the m functional circuits is a time corresponding to an integer times the delay time.

Further, a second aspect of the present invention is a ramp wave generation circuit comprising a pulse output unit including a delay part having a plurality of delay units that delay and output an input signal, and a delay control part controlling a delay time by which the delay unit delays a signal, wherein the pulse output unit outputs a plurality of signals having logic states corresponding to logic states of signals output by the delay units and a time corresponding to the delay time that a time difference between timings at which the logic states of the respective signals are changed is, m (m is a natural number greater than or equal to 2) functional circuits having an upper current source cell part including upper current source cells that generate a same constant current, a lower current source cell part including a plurality of lower current source cells that generate a current value of a predetermined percentage of a current value of the constant current generated by the upper current source cell, a lower bit selection part selecting the lower current source cell based on an output of the pulse output unit, and an upper bit selection part selecting the upper current source cell based on an output of the pulse output unit, an addition unit adding currents output from the m functional circuits, and a conversion unit converting an current added by the addition part into a voltage and output the voltage, wherein a time difference between a timing of a selection operation of the lower bit selection part and the upper bit selection part had in one functional circuit in the m functional circuits and a timing of a selection operation of the lower bit selection part and the upper bit selection part had in the other functional circuit in the m functional circuits is a time corresponding to an integer times the delay time.

Further, according to a third aspect of the present invention, in the ramp wave generation circuit according to the first aspect or the second aspect, the delay part may be a circular ring delay circuit in which the delay units are connected in a ring shape.

Further, according to a fourth aspect of the present invention, in the ramp wave generation circuit according to the first aspect or the second aspect, the upper bit selection part may include a shift register part selecting the upper current source cell, and a shift control part generating a shift clock to be given to the shift register part based on the output of the pulse output unit.

Further, according to a solid-state imaging device of a fifth aspect of the present invention, the solid-state imaging device may comprise an imaging unit in which a plurality of pixels that output a pixel signal according to an amount of an incident electromagnetic wave are arranged in a matrix shape; and the ramp wave generation circuit of the first aspect or the second aspect.

DETAILED DESCRIPTION OF THE INVENTION

Hereinafter, embodiments of the present invention will be described with reference to the drawings.

First Embodiment

Figure 1:
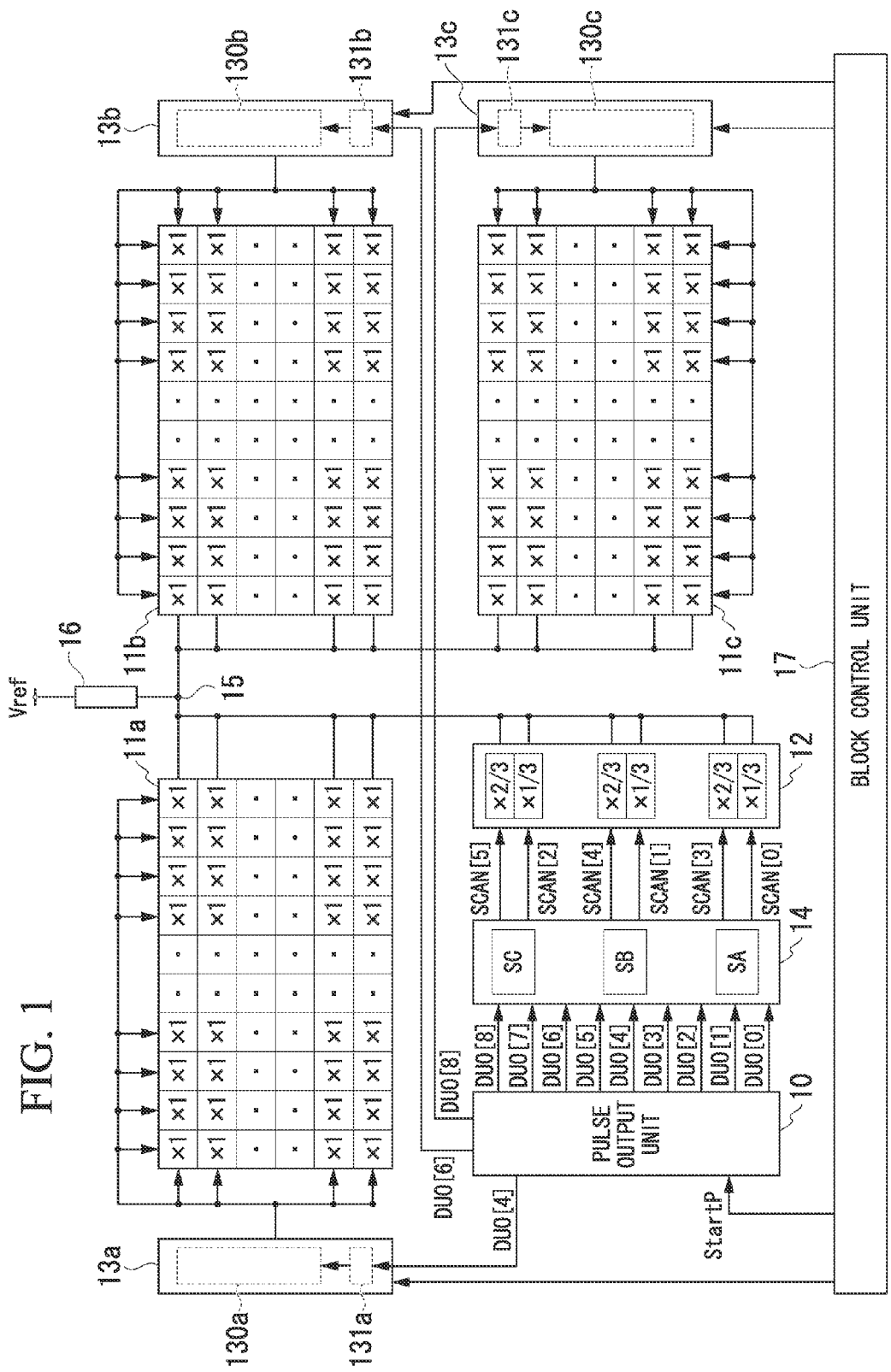
FIG. 1 is a block diagram illustrating a configuration of a ramp wave generation circuit according to a first embodiment of the present invention.

First, a first embodiment of the present invention will be described. FIG. 1 illustrates one example of a configuration of a ramp wave generation circuit according to the present embodiment. The ramp wave generation circuit illustrated in FIG. 1 includes a pulse output unit 10, upper current source cell parts 11a, 11b and 11c, a lower current source cell part 12, upper bit selection parts 13a, 13b and 13c, a lower bit selection part 14, an addition part 15, a conversion part 16, and a block control unit 17.

The pulse output unit 10 generates and outputs pulses DUO[0] to DUO[8]. The upper current source cell parts 11a, 11b and 11c include a plurality of upper current source cells (cells described as "×1" in FIG. 1) that generate the same constant current. The upper current source cells are arranged in a matrix shape.

The lower current source cell part 12 includes a plurality of lower current source cells (cells described as "×⅓" and "×⅔" in FIG. 1). The lower current source cells are weighted to generate a current value different by ⅓ from a current value of the constant current generated by the individual upper current source cells constituting the upper current source cell parts 11a, 11b and 11c. In other words, when the current value of the constant current generated by one upper current source cell is I, the lower current source cells constituting the lower current source cell part 12 generate currents having current values of I/3 and 2×I/3.

Further, the lower current source cell part 12 includes three sets of a lower current source cell that generates current having a current value of I/3 and a lower current source cell that generates current having a current value of 2×I/3.

The upper bit selection part 13a selects the upper current source cell of the upper current source cell part 11a based on the signal DUO[4] output from the pulse output unit 10. The upper bit selection part 13b selects the upper current source cell of the upper current source cell part 11b based on the signal DUO[6] output from the pulse output unit 10.

The upper bit selection part 13c selects the upper current source cell of the upper current source cell part 11c based on the signal DUO[8] output from the pulse output unit 10.

The upper bit selection parts 13a, 13b and 13c include shift register parts 130a, 130b and 130c that generate signals for selecting the upper current source cell and output the signal to the upper current source cell parts 11a, 11b and 11c, and shift control parts 131a, 131b and 131c that generate shift clocks for causing the shift register parts 130a, 130b and 130c to perform a shift operation based on the signals DUO[4], DUO[6] and DUO[8] output from the pulse output unit 10. The shift register parts 130a, 130b and 130c include substantially as many shift register circuits as the upper current source cells.

The lower bit selection part 14 selects the lower current source cell of the lower current source cell part 12 based on the signals DUO[0] to DUO[8] output from the pulse output unit 10. The lower bit selection part 14 includes a first lower bit selection part SA that generates signals SCAN[0] and SCAN[3] for selecting the lower current source cells, a second lower bit selection part SB that generates signals SCAN[1] and SCAN[4] for selecting the lower current source cells, and a third lower bit selection part SC for generating signals SCAN[2] and SCAN[5] for selecting the lower current source cells.

The addition part 15 adds constant currents output from the upper current source cells constituting the upper current source cell parts 11a, 11b and 11c and the lower current source cells constituting the lower current source cell part 12, and outputs a resultant current. The conversion part 16 converts the current output by the addition part 15 into a voltage signal and outputs the voltage signal. For example, it is assumed that a resistor element or a capacitive element is used as the conversion part 16, but the present invention is not limited thereto. The block control unit 17 controls each of the above parts.

The upper current source cell part 11a, one set of lower current source cells of the lower current source cell part 12, the upper bit selection part 13a, and the first lower bit selection part SA of the lower bit selection part 14 constitute a first functional circuit. The upper current source cell part 11b, one set of lower current source cells of the lower current source cell part 12, the upper bit selection part 13b, and the second lower bit selection part SB of the lower bit selection part 14 constitute a second functional circuit. The upper current source cell part 11c, one set of lower current source cells of the lower current source cell part 12, the upper bit selection part 13c, and the third lower bit selection part SC of the lower bit selection part 14 constitute a third functional circuit. It is preferable that the three functional circuits have a substantially similar configuration, but the present invention is not limited thereto.

Figure 2:
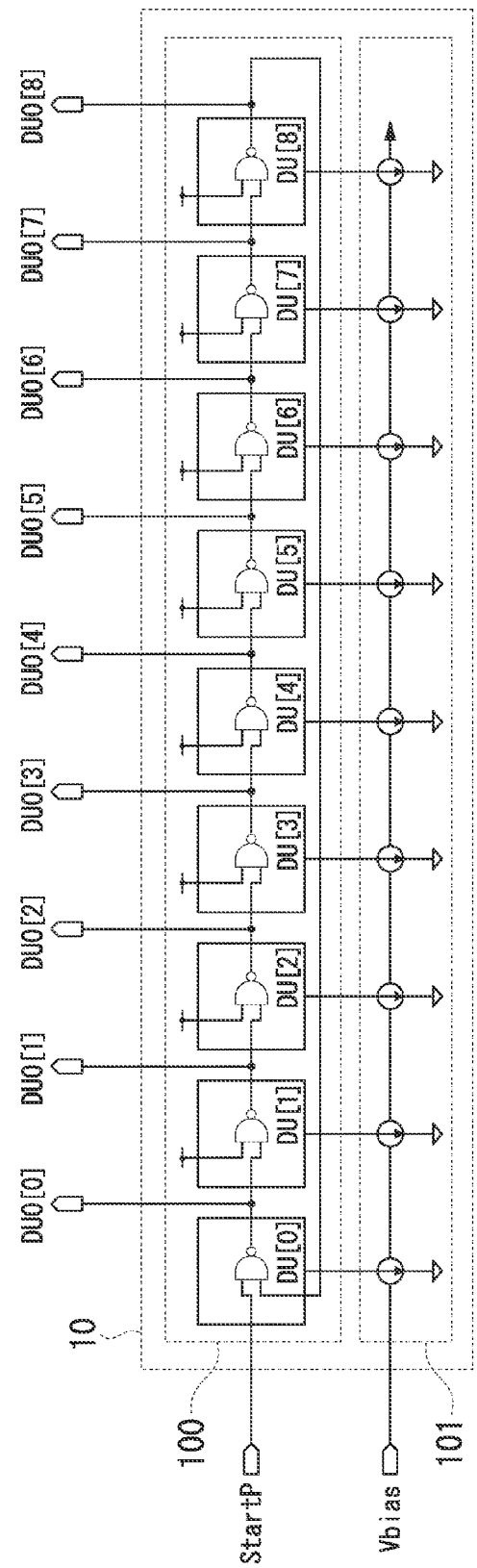
FIG. 2 is a circuit diagram illustrating a configuration of a pulse output unit included in the ramp wave generation circuit according to the first embodiment of the present invention.

FIG. 2 illustrates a detailed configuration of the pulse output unit 10. The pulse output unit 10 includes a delay part 100 and a delay control part 101. The delay part 100 has a configuration in which a plurality of delay units DU[*] (* is 0 to 8) that delay and output an input signal are connected. A start pulse (=StartP) input to the delay unit DU[0] of a first stage is delayed by the respective delay units and output from the delay unit DU[8] of a last stage. Each delay unit DU[*] includes a NAND circuit that is an inverting element. An output of the delay unit DU[8] of the last stage is connected to an input of the delay unit DU[0] of the first stage, and the delay units DU[0] to DU[8] constitute a circular ring delay circuit connected in a ring shape. The delay control part 101 includes variable current sources that control a delay time by which the delay unit DU[*] delays the signal. A current value of the variable current source is controlled by changing a bias voltage Vbias.

Further, the delay units are not limited to this configuration. The delay control part 101 is not limited to such a configuration either. While the variable current source is provided below the delay unit in FIG. 2, but may be provided above the delay unit rather than below the delay unit or may be provided below and above the delay unit. The present invention need not be limited thereto.

Figure 3:
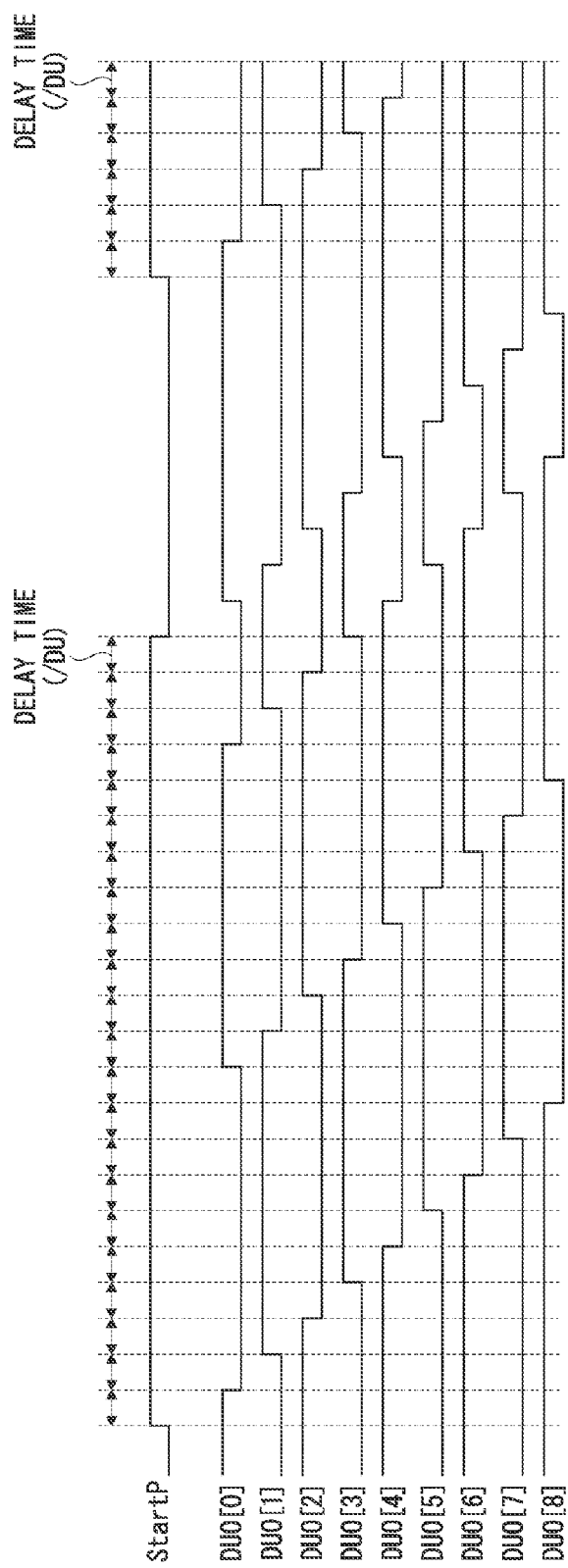
FIG. 3 is a timing chart illustrating an operation of the pulse output unit included in the ramp wave generation circuit according to the first embodiment of the present invention.

FIG. 3 illustrates an operation of the pulse output unit 10. When a logic state of the start pulse StartP input to the delay unit DU[0] of the first stage is changed from an L (Low) state to a H (High) state, the delay unit DU[*] constituting the delay part 100 starts a transition operation. A logic state of the signal DUO[0] output from the delay unit DU[0] is changed from being in the H state to being in the L state at a timing at which the delay time of the delay unit DU[0] elapses after the logic state of the start pulse StartP is changed. Then, a logic state of the signal DUO[1] output from the delay unit DU[1] is changed from being in the L state to being in the H state at a timing at which the delay time of the delay unit DU[1] elapses after the logic state of the signal DUO[0] is changed. Thereafter, similarly, the logic states of the signal DUO[*] output from the delay unit DU[*] are sequentially changed.

According to this operation, the logic state of the signal DUO[*] output from the delay unit DU[*] is changed at a timing at which the delay time of the delay unit DU[*] has elapsed from the timing at which the logic state of the signal DUO[*] output from the immediately previous delay unit DU[*] is changed. In other words, timings at which the logic states of the respective signals DUO[0] to DUO[8] output by the pulse output unit 10 are changed differ by the delay time of the delay unit DU[*].

Figure 4:
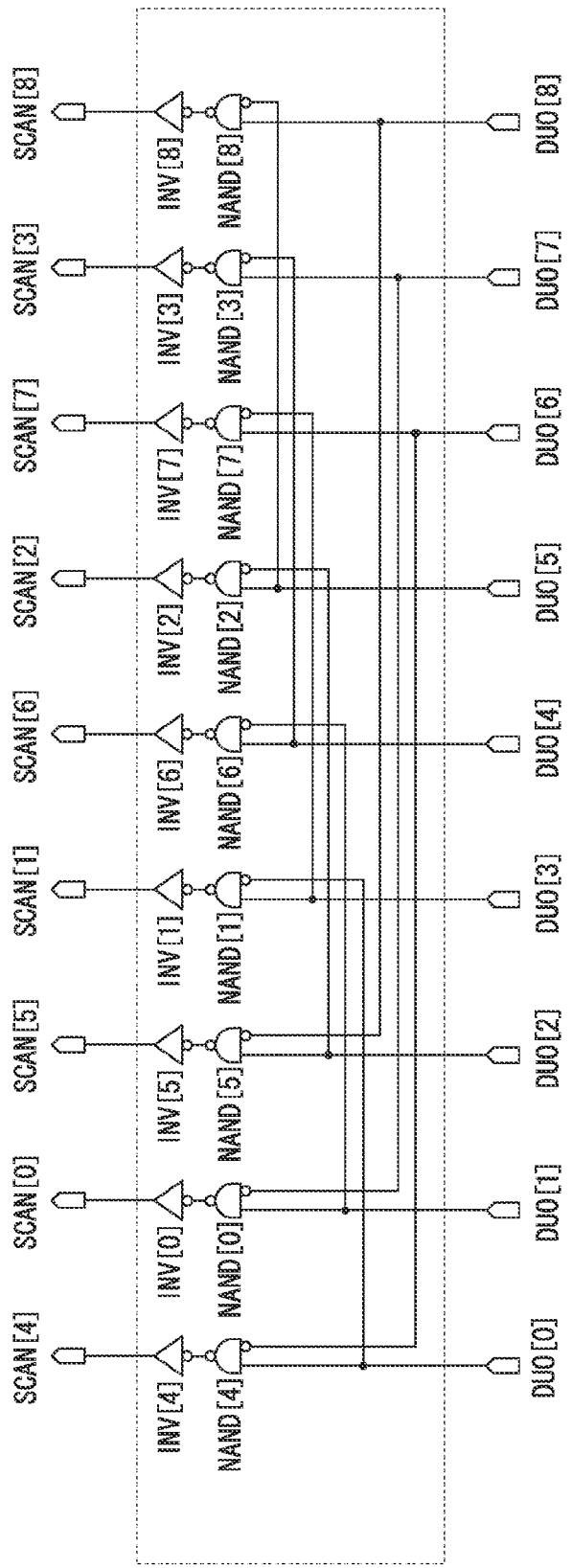
FIG. 4 is a circuit diagram illustrating a configuration of a lower bit selection part included in the ramp wave generation circuit according to the first embodiment of the present invention.

FIG. 4 illustrates a detailed configuration of the lower bit selection part 14. The lower bit selection part 14 generates and outputs a pulse signal having a predetermined logic at a predetermined timing by performing a logical operation on the signals output from the plurality of delay units DU[*] included in the pulse output unit 10. The lower bit selection part 14 includes an inverter circuit INV[*] (* is 0 to 8), and a NAND circuit NAND[*] (* is 0 to 8).

The signal output from the predetermined delay unit is inverted and input to one input terminal of the NAND circuit NAND[*], and the signal output from the delay unit before three stages from the predetermined delay unit is input to the other input terminal of the NAND circuit NAND[*]. A signal output from the NAND circuit NAND[*] is inverted by the inverter circuit INV[*] in order to obtain a desired logic, and output the signal as a signal SCAN_[*].

In other words, the lower bit selection part 14 outputs the signal obtained by performing a logic product operation (AND) of the signal output from the predetermined delay unit and the signal obtained by inverting the signal output from the delay unit before three stages from the predetermined delay unit.

The NAND circuits NAND[0] and NAND[3] and the inverter circuits INV[0] and INV[3] correspond to the first lower bit selection part SA in FIG. 1. The NAND circuits NAND[1] and NAND[4] and the inverter circuits INV[1] and INV[4] correspond to the second lower bit selection part SB of FIG. 1. And the NAND circuits NAND[2] and NAND[5] and the inverter circuits INV[2] and INV[5] correspond to the third lower bit selection part SC of FIG. 1. Further, this configuration is one example and the present invention is not limited thereto.

Figure 5:
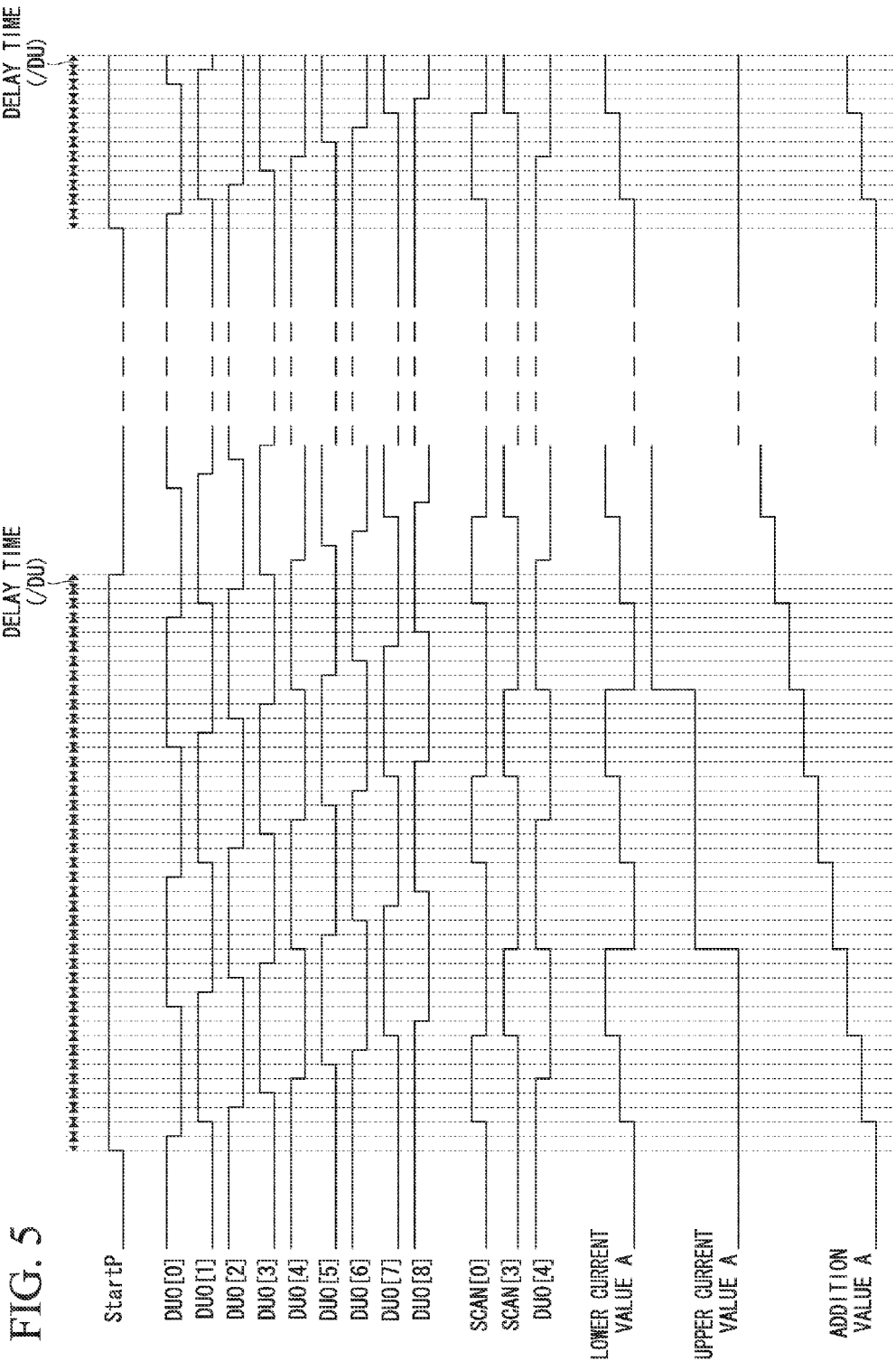
FIG. 5 is a timing chart illustrating an operation of the ramp wave generation circuit according to the first embodiment of the present invention.

Next, an operation of the ramp wave generation circuit will be described. FIG. 5 illustrates the signals DUO[0] to DUO[8] output by the pulse output unit 10, the signals SCAN[0] and SCAN[3] for selection of the lower current source cell of the lower current source cell part 12 in the first functional circuit, the signal DUO[4] for selection of the upper current source cell of the upper current source cell part 11a in the first functional circuit, a lower current value A generated by the lower current source cell part 12 in the first functional circuit, an upper current value A generated by the upper current source cell part 11a in the first functional circuit, and an addition value A that is a sum of the lower current value A and the upper current value A.

Figure 6:
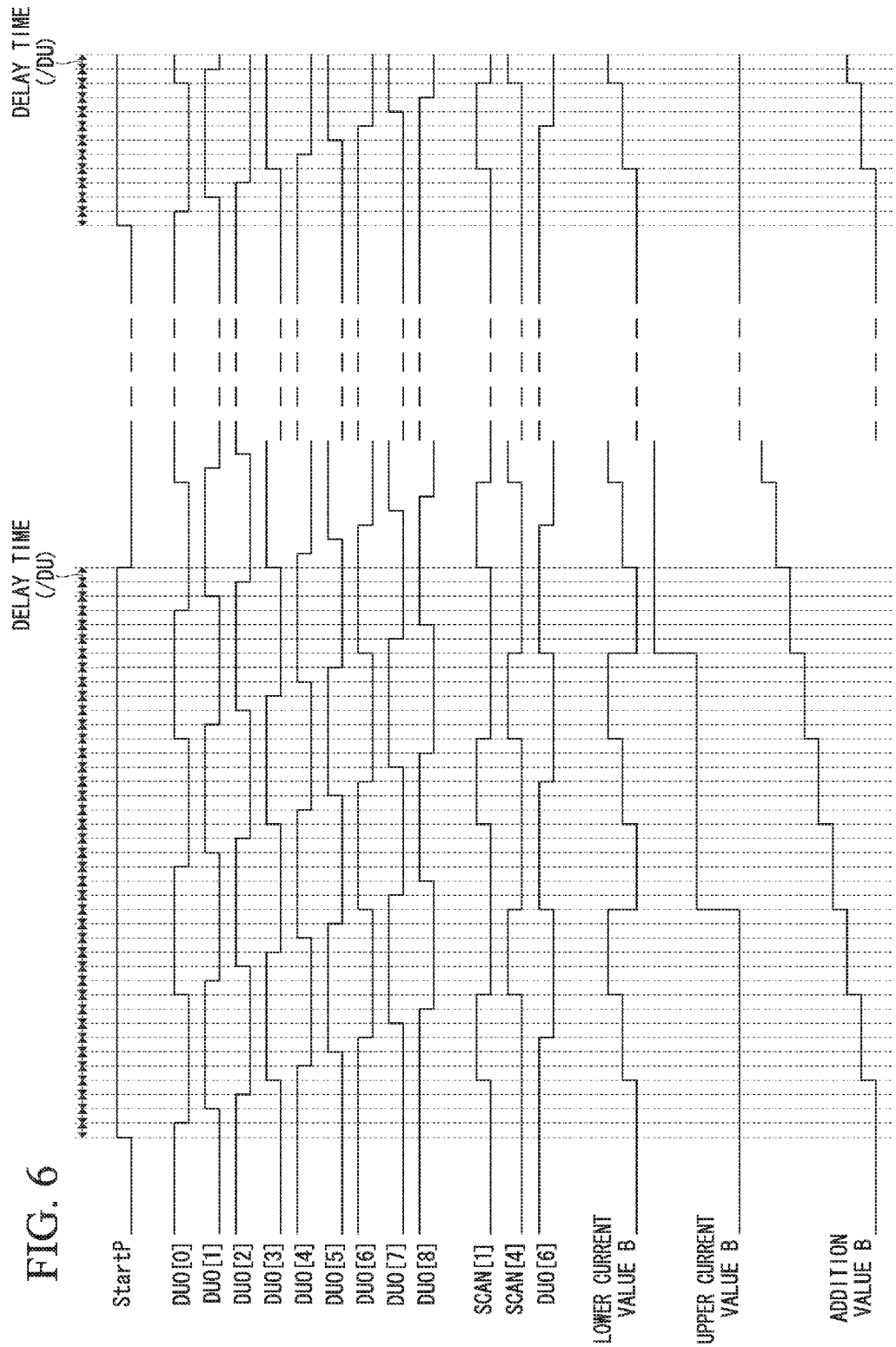
FIG. 6 is a timing chart illustrating an operation of the ramp wave generation circuit according to the first embodiment of the present invention.

FIG. 6 illustrates the signals DUO[0] to DUO[8] output by the pulse output unit 10, the signals SCAN[1] and SCAN[4] for selection of the lower current source cell of the lower current source cell part 12 in the second functional circuit, the signal DUO[6] for selection of the upper current source cell of the upper current source cell part 11b in the second functional circuit, a lower current value B generated by the lower current source cell part 12 in the second functional circuit, an upper current value B generated by the upper current source cell part 11b in the second functional circuit, and an addition value B that is a sum of the lower current value B and the upper current value B.

Figure 7:
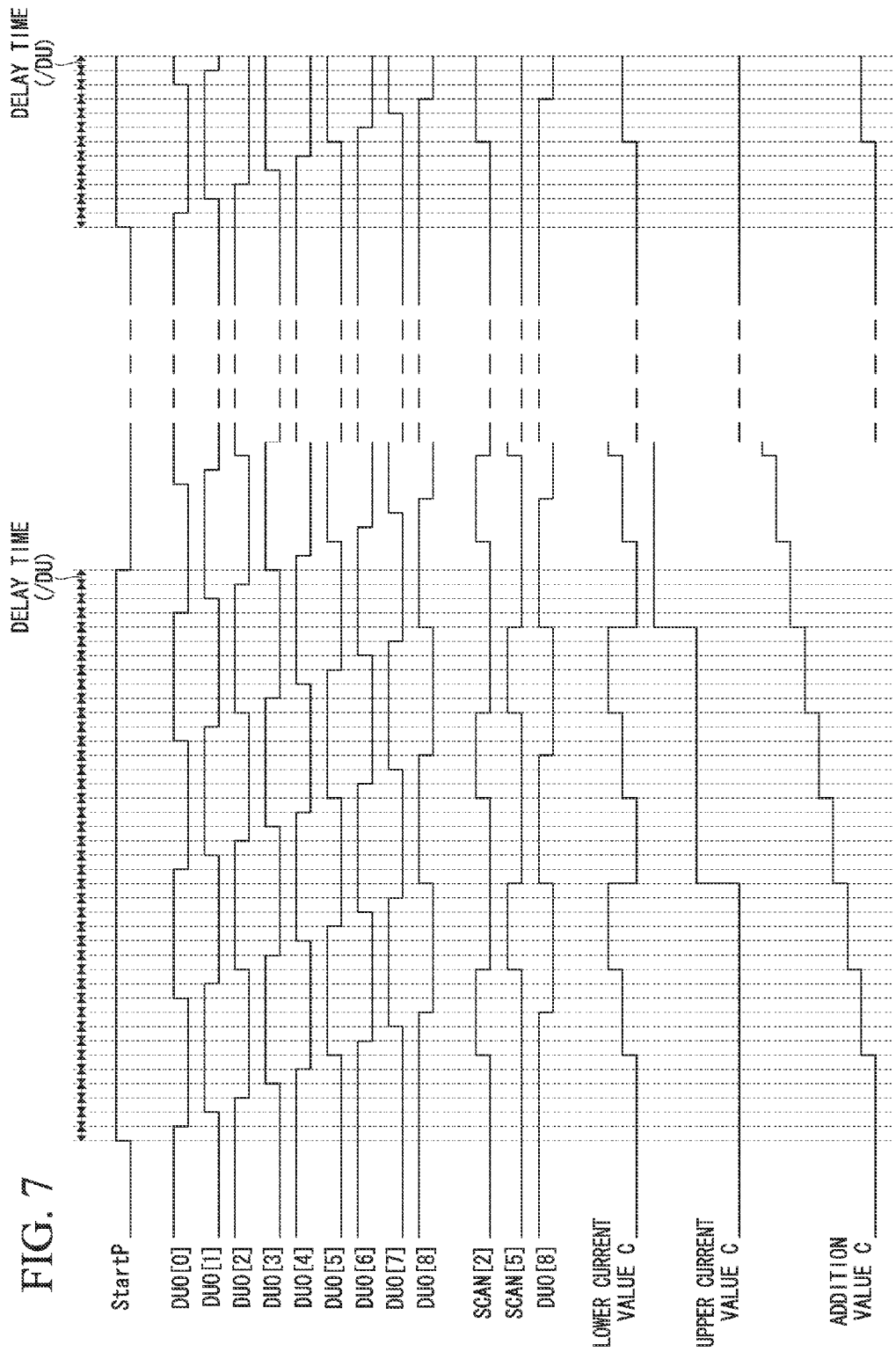
FIG. 7 is a timing chart illustrating an operation of the ramp wave generation circuit according to the first embodiment of the present invention.

FIG. 7 illustrates the signals DUO[0] to DUO[8] output by the pulse output unit 10, the signals SCAN[2] and SCAN[5] for selection of the lower current source cell of the lower current source cell part 12 in the third functional circuit, the signal DUO[8] for selection of the upper current source cell of the upper current source cell part 11c in the third functional circuit, a lower current value C generated by the lower current source cell part 12 in the third functional circuit, an upper current value C generated by the upper current source cell part 11c in the third functional circuit, and an addition value C that is the sum of the lower current value C and the upper current value C.

First, as the logic state of the start pulse (=StartP) is changed from being in the L state to being in the H state, the delay unit DU[*] (* is 0 to 8) in the pulse output unit 10 starts a transition operation. According to the transition operation of the delay unit DU[*], logic states of the signal DUO[*] (* is 0 to 8) output from the pulse output unit are sequentially changed. Each signal DUO[*] is input to the corresponding functional circuit.

The first to third functional circuits operate in synchronization with the signal DUO[*] output from the pulse output unit 10. Hereinafter, an operation of each functional circuit will be described. Hereinafter, for simplicity of description, it is assumed that a current value output by one upper current source cell is 1 and current values output by one lower current source cell (two types) are ⅓ and ⅔.

In the first functional circuit, the lower current source cell of the lower current source cell part 12 is selected at a timing at which the signals SCAN[0] and SCAN[3] output by the first lower bit selection part SA of the lower bit selection part 14 are changed from being in the L state to being in the H state, and the lower current value A corresponding to the selected lower current source cell is output. Further, in the first functional circuit, the upper current source cell of the upper current source cell part 11a is selected at a timing at which the signal DUO[4] input to the upper bit selection part 13a is changed from being in the L state to being in the H state, and the upper current value A corresponding to the selected upper current source cell is output.

A concrete operation for selection of the lower current source cell in the first functional circuit is as follows. The signal SCAN[0] is changed from being in the L state to being in the H state at a timing at which the signal DUO[1] is changed from being in the L state to being in the H state. Accordingly, the lower current source cell that outputs the current value of ⅓ is selected, and the lower current value A increases by ⅓. Then, at a timing at which the signal DUO[7] is changed from being in the L state to being in the H state, the signal SCAN[0] is changed from being in the H state to being in the L state and the signal SCAN[3] is changed from being in the L state to being in the H state. Accordingly, the lower current source cell that outputs the current value of ⅓ is not selected, the lower current source cell that outputs the current value of ⅔ is selected, and the lower current value A increases by ⅓. Then, the signal SCAN[3] is changed from being in the H state to being in the L state at a timing at which the signal DUO[4] is changed from being in the L state to being in the H state. Accordingly, the lower current source cell that outputs the current value of ⅔ is not selected, and the lower current value A becomes 0. As this operation is repeatedly performed, the selection of the lower current source cell is performed.

A concrete operation for selection of the upper current source cell in the first functional circuit is as follows. The shift control part 131a of the upper bit selection part 13a generates a shift clock based on a change in the signal DUO[4] at a timing at which the signal DUO[4] is changed from being in the L state to being in the H state. The shift register part 130a of the upper bit selection part 13a performs one-stage shift based on the shift clock. Accordingly, the upper current source cell is selected, and the upper current value A increases by 1. Thereafter, similarly, the upper current source cell is selected at a timing at which the signal DUO[4] is changed from being in the L state to being in the H state, and the upper current value A increases by 1. As this operation is repeatedly performed, the selection of the upper current source cell is performed. According to the above operation, the addition value A increases in increments of ⅓.

In the second functional circuit, the lower current source cell of the lower current source cell part 12 is selected at a timing at which the signals SCAN[1] and SCAN[4] output by the second lower bit selection part SB of the lower bit selection part 14 are changed from being in the L state to being in the H state, and the lower current value B corresponding to the selected lower current source cell is output. Further, in the second functional circuit, the upper current source cell of the upper current source cell part 11b is selected at a timing at which the signal DUO[6] input to the upper bit selection part 13b is changed from being in the L state to being in the H state, and the upper current value B corresponding to the selected upper current source cell is output.

A concrete operation for selection of the lower current source cell in the second functional circuit is as follows. The signal SCAN[1] is changed from being in the L state to being in the H state at a timing at which the signal DUO[3] is changed from being in the L state to being in the H state. Accordingly, the lower current source cell that outputs the current value of ⅓ is selected, and the lower current value B increases by ⅓. Then, at a timing at which the signal DUO[0] is changed from being in the L state to being in the H state, the signal SCAN[1] is changed from being in the H state to being in the L state and the signal SCAN[4] is changed from being in the L state to being in the H state. Accordingly, the lower current source cell that outputs the current value of ⅓ is not selected, the lower current source cell that outputs the current value of ⅔ is selected, and the lower current value B increases by ⅓. Then, the signal SCAN[4] is changed from being in the H state to being in the L state at a timing at which the signal DUO[6] is changed from being in the L state to being in the H state. Accordingly, the lower current source cell that outputs the current value of ⅔ is not selected, and the lower current value B becomes 0. As this operation is repeatedly performed, the selection of the lower current source cell is performed.

A concrete operation for selection of the upper current source cell in the second functional circuit is as follows. The shift control part 131b of the upper bit selection part 13b generates a shift clock based on a change in the signal DUO [6] at a timing at which the signal DUO[6] is changed from being in the L state to being in the H state. The shift register part 130b of the upper bit selection part 13b performs one-stage shift based on the shift clock. Accordingly, the upper current source cell is selected, and the upper current value B increases by 1. Thereafter, similarly, the upper current source cell is selected at a timing at which the signal DUO[6] is changed from being in the L state to being in the H state, and the upper current value B increases by 1. As this operation is repeatedly performed, the selection of the upper current source cell is performed. According to the above operation, the addition value B increases in increments of ⅓.

In the third functional circuit, the lower current source cell of the lower current source cell part 12 is selected at a timing at which the signals SCAN[2] and SCAN[5] output by the third lower bit selection part SC of the lower bit selection part 14 is changed from being in the L state to being in the H state, and the lower current value C corresponding to the selected lower current source cell is output. Further, in the third functional circuit, the upper current source cell of the upper current source cell part 11c is selected at a timing at which the signal DUO[8] input to the upper bit selection part 13c is changed from being in the L state to being in the H state, and the upper current value C corresponding to the selected upper current source cell is output.

A concrete operation for selection of the lower current source cell in the third functional circuit is as follows. The signal SCAN[2] is changed from being in the L state to being in the H state at a timing at which the signal DUO[5] is changed from being in the L state to being in the H state. Accordingly, the lower current source cell that outputs the current value of ⅓ is selected, and the lower current value C increases by ⅓. Then, at a timing at which the signal DUO[2] is changed from being in the L state to being in the H state, the signal SCAN[2] is changed from being in the H state to being in the L state and the signal SCAN[5] is changed from being in the L state to being in the H state. Accordingly, the lower current source cell that outputs the current value of ⅓ is not selected, the lower current source cell that outputs the current value of ⅔ is selected, and the lower current value C increases by ⅓. Then, the signal SCAN[5] is changed from being in the H state to being in the L state at a timing at which the signal DUO[8] is changed from being in the L state to being in the H state. Accordingly, the lower current source cell that outputs the current value of ⅔ is not selected, and the lower current value C becomes 0. As this operation is repeatedly performed, the selection of the lower current source cell is performed.

A concrete operation for selection of the upper current source cell in the third functional circuit is as follows. The shift control part 131c of the upper bit selection part 13c generates a shift clock based on a change in the signal DUO [8] at a timing at which the signal DUO[8] is changed from being in the L state to being in the H state. The shift register part 130c of the upper bit selection part 13c performs one-stage shift based on the shift clock. Accordingly, the upper current source cell is selected, and the upper current value C increases by 1. Thereafter, similarly, at a timing at which the signal DUO[8] is changed from being in the L state to being in the H state, the upper current source cell is selected and the upper current value C increases by 1. As this operation is repeatedly performed, the selection of the upper current source cell is performed. According to the above operation, the addition value C increases in increments of ⅓.

The constant current outputs from the respective functional circuits are added by the addition part 15 (the addition value A+the addition value B+the addition value C), and are converted into a voltage by the conversion part 16. The addition value that is a sum of the addition value A, the addition value B, and the addition value C increases in increments of ⅓ (see FIG. 8).

Figure 8:
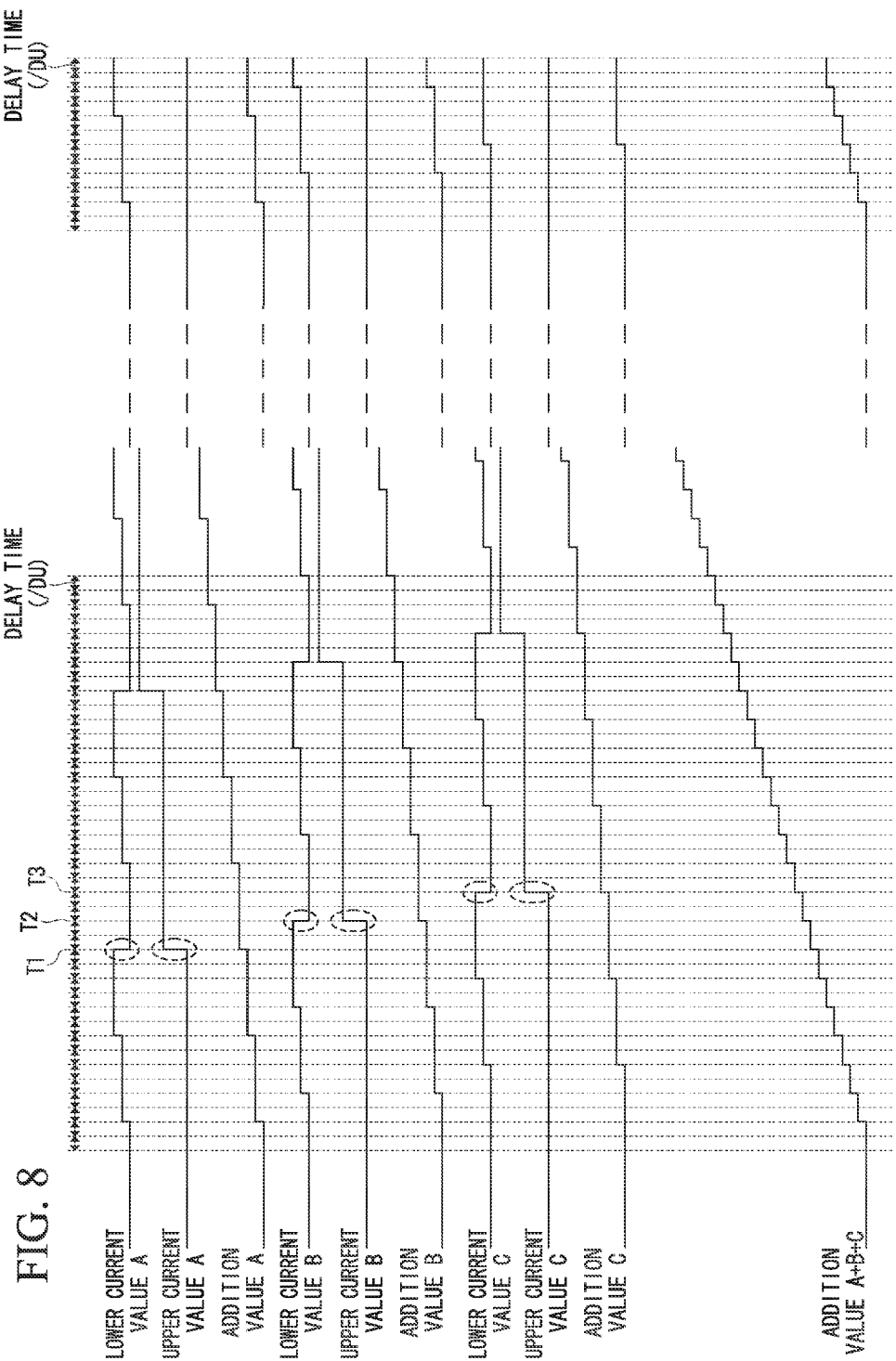
FIG. 8 is a timing chart illustrating an operation of the ramp wave generation circuit according to the first embodiment of the present invention.

As illustrated in FIG. 8, the lower current value B is changed at a timing at which a delay time of the delay units corresponding to two stages has elapsed from a timing at which the lower current value A is changed, and the lower current value C is changed at a timing at which the delay time of the delay units corresponding to two stages has elapsed from a timing at which the lower current value B is changed. Further, in the present example, a timing at which each lower current value becomes 0 is used as a reference. Similarly, the upper current value B is changed at a timing at which the delay time of the delay units corresponding to two stages has elapsed from a timing at which the upper current value A is changed, and the upper current value C is changed at a timing at which the delay time of the delay units corresponding to two stages has elapsed from a timing at which the upper current value B is changed. Further, in the present example, a timing at which each upper current value increases is used as a reference.

In other words, the selection/non-selection of the lower current source cell and the upper current source cell by the second lower bit selection part SB and the upper bit selection part 13b of the second functional circuit is performed at a timing at which a certain time (in the case of the present example, the delay time of the delay units corresponding to two stages) has elapsed from a timing for selection/non-selection of the lower current source cell and the upper current source cell by the first lower bit selection part SA and the upper bit selection part 13a of the first functional circuit. The timing of selection/non-selection of the lower current source cell and the upper current source cell is similar in the second functional circuit and the third functional circuit. Accordingly, the first to third functional circuits operate in synchronization with the signal output from the pulse output unit 10, and timings for selection/non-selection of the lower current source cell and the upper current source cell by the respective functional circuits have a certain time difference.

As described above, according to the present embodiment, the first to third functional circuits can select the lower current source cell and the upper current source cell based on the signal DUO[*] (* is 0 to 8) whose logic state is changed with the time difference according to the delay time of the delay unit DU[*] (* is 0 to 8) of the pulse output unit 10. Accordingly, it is unnecessary to shape the driving clock and it is possible to easily realize a high-speed operation of each functional circuit.

Figure 20:
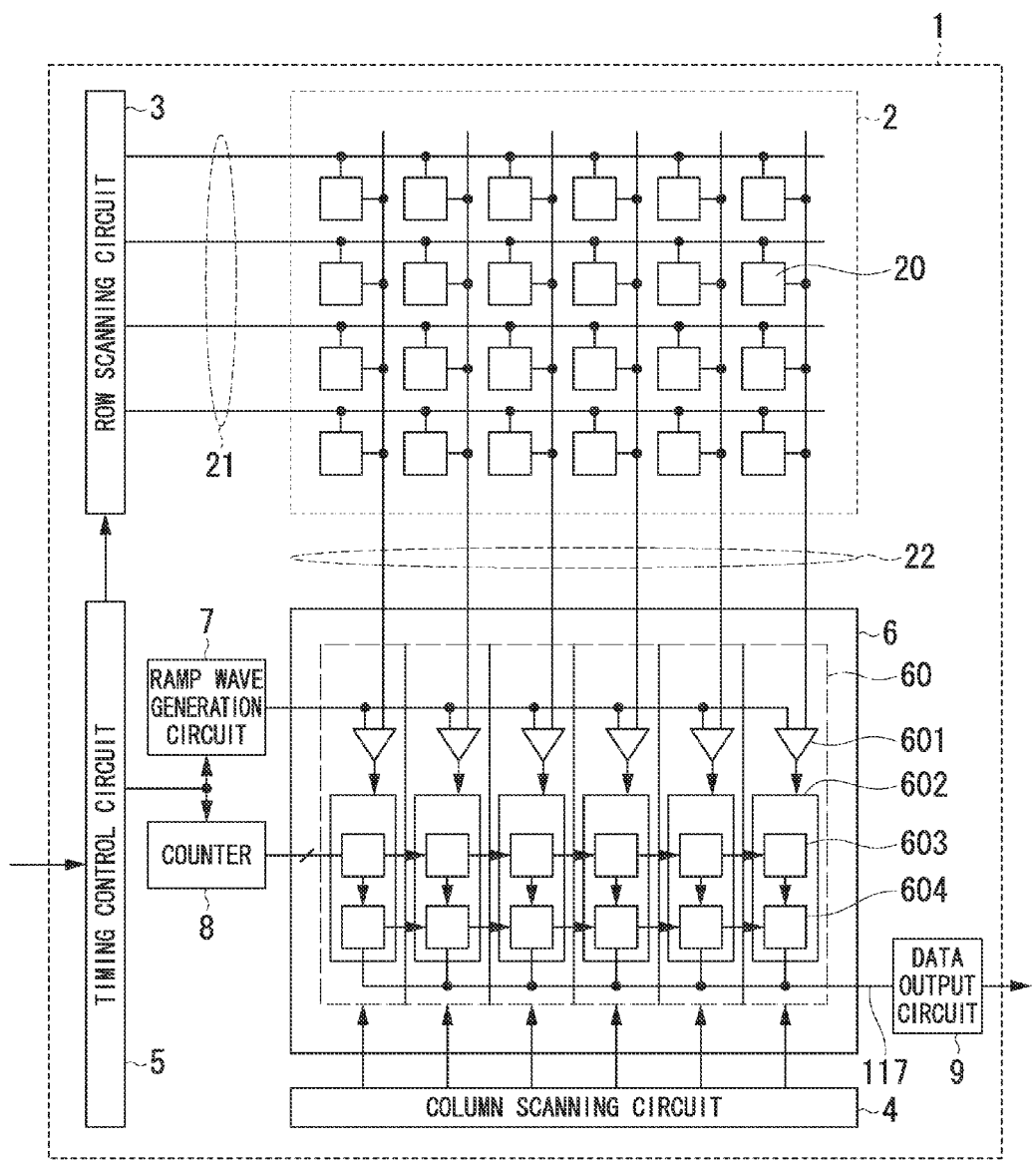
FIG. 20 is a block diagram illustrating a configuration of a solid-state imaging device of related art.

Further, as the respective functional circuits operate with a certain time difference, it may generate a stable ramp wave whose voltage is changed at a predetermined time interval. Accordingly, it may suppress a glitch from being generated or code from being missed. It may realize a high-speed solid-state imaging device by providing the ramp wave generation circuit, for example, in place of the ramp wave generation circuit 7 of FIG. 20.

Further, according to the present embodiment, the following effects are obtained. In a general ramp wave generation circuit using a DA converter, the selection of the lower current source cell is performed using the signal output from the counter circuit, and the selection of the upper current source cell is performed using the signal obtained by decoding the signal output from the counter circuit. Accordingly, when the selection/non-selection of the lower current source cell and the selection of the upper current source cell are simultaneously performed, it is difficult to match timings of the selection/non-selection of the lower current source cell and the selection of the upper current source cell and a glitch is generated due to a discrepancy in timing between the selection/non-selection of the lower current source cell and the selection of the upper current source cell. On the other hand, in the present embodiment, as the shift register part and the shift control part constitute the upper bit selection part, it is possible to suppress discrepancy in timing between the selection/non-selection of the lower current source cell and the selection of the upper current source cell and to suppress the generation of the glitch.

Second Embodiment

Figure 9:
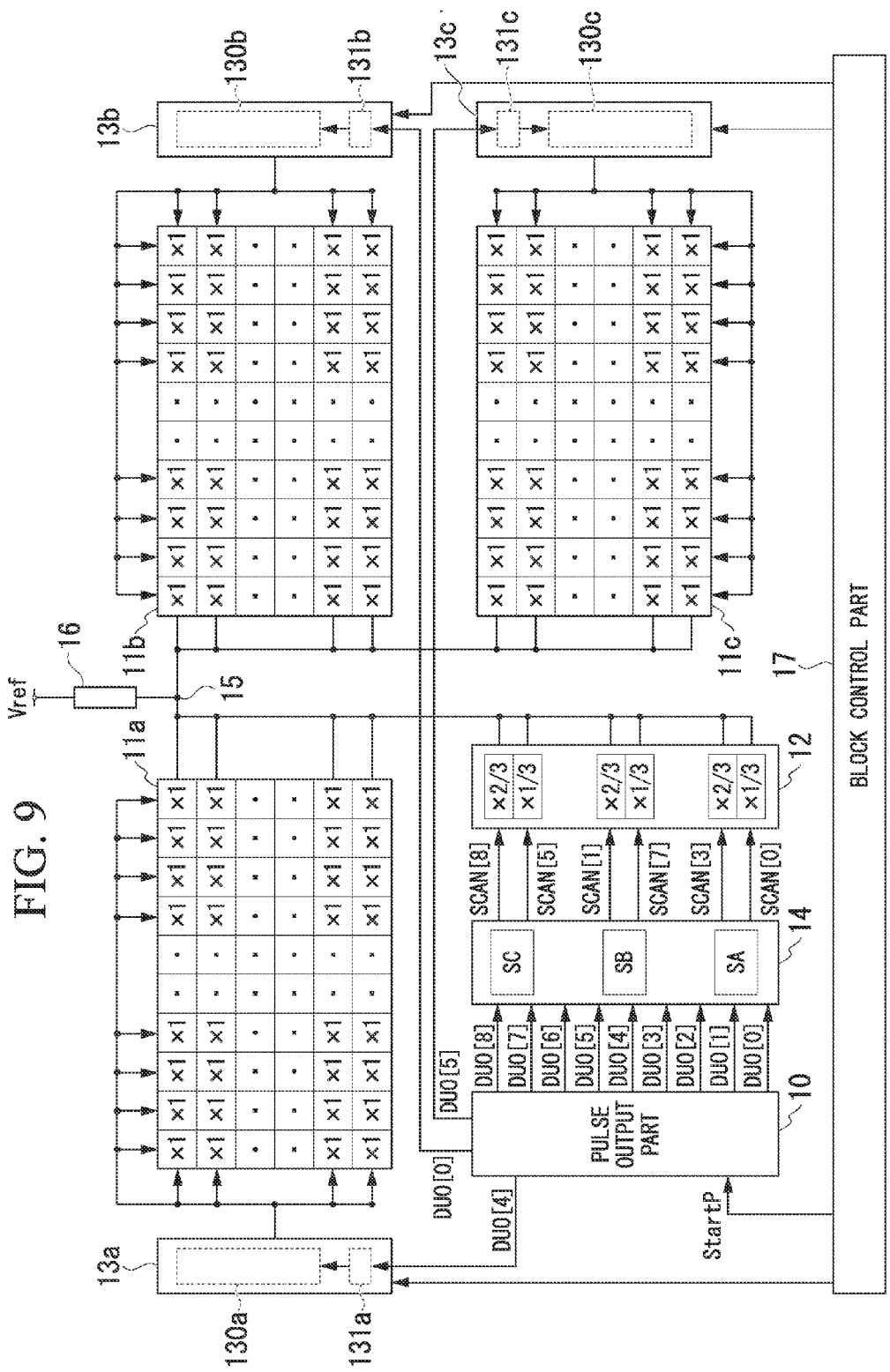
FIG. 9 is a block diagram illustrating a configuration of a ramp wave generation circuit according to a second embodiment of the present invention.

Next, a second embodiment of the present invention will be described. FIG. 9 illustrates one example of a configuration of a ramp wave generation circuit according to the present embodiment. Since signals other than the signal output from the pulse output unit 10 to the upper bit selection parts 13a, 13b and 13c and the signal output from the lower bit selection part 14 to the lower current source cell part 12 are similar to those in the ramp wave generation circuit illustrated in FIG. 1, a description thereof will be omitted here.

The upper bit selection part 13a selects the upper current source cell of the upper current source cell part 11a based on the signal DUO[4] output from the pulse output unit 10. The upper bit selection part 13b selects the upper current source cell of the upper current source cell part 11b based on the signal DUO[0] output from the pulse output unit 10.

The upper bit selection part 13c selects the upper current source cell of the upper current source cell part 11c based on the signal DUO[5] output from the pulse output unit 10.

The first lower bit selection part SA of the lower bit selection part 14 outputs signals SCAN[0] and SCAN[3] to the lower current source cell part 12, the second lower bit selection part SB of the lower bit selection part 14 outputs signals SCAN[7] and SCAN[1] to the lower current source cell part 12, and the third lower bit selection part SC of the lower bit selection part 14 outputs signals SCAN[5] and SCAN[8] to the lower current source cell part 12.

Figure 10:
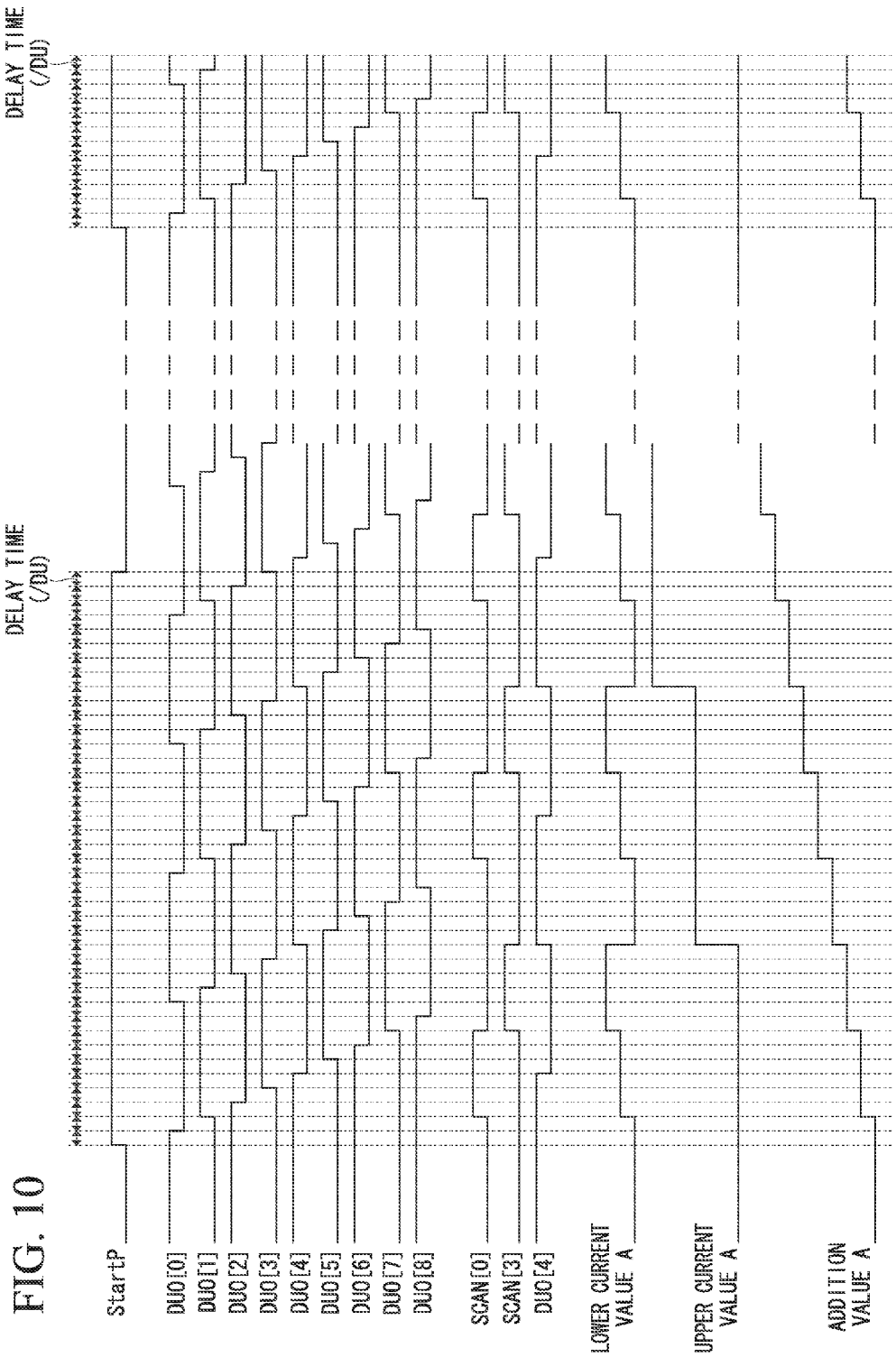
FIG. 10 is a timing chart illustrating an operation of the ramp wave generation circuit according to the second embodiment of the present invention.

Next, an operation of the ramp wave generation circuit will be described. FIG. 10 illustrates the signals DUO[0] to DUO[8] output by the pulse output unit 10, the signals SCAN[0] and SCAN[3] for selection of the lower current source cell of the lower current source cell part 12 in the first functional circuit, the signal DUO[4] for selection of the upper current source cell of the upper current source cell part 11a in the first functional circuit, a lower current value A generated by the lower current source cell part 12 in the first functional circuit, an upper current value A generated by the upper current source cell part 11a in the first functional circuit, and an addition value A that is the sum of the lower current value A and the upper current value A.

Figure 11:
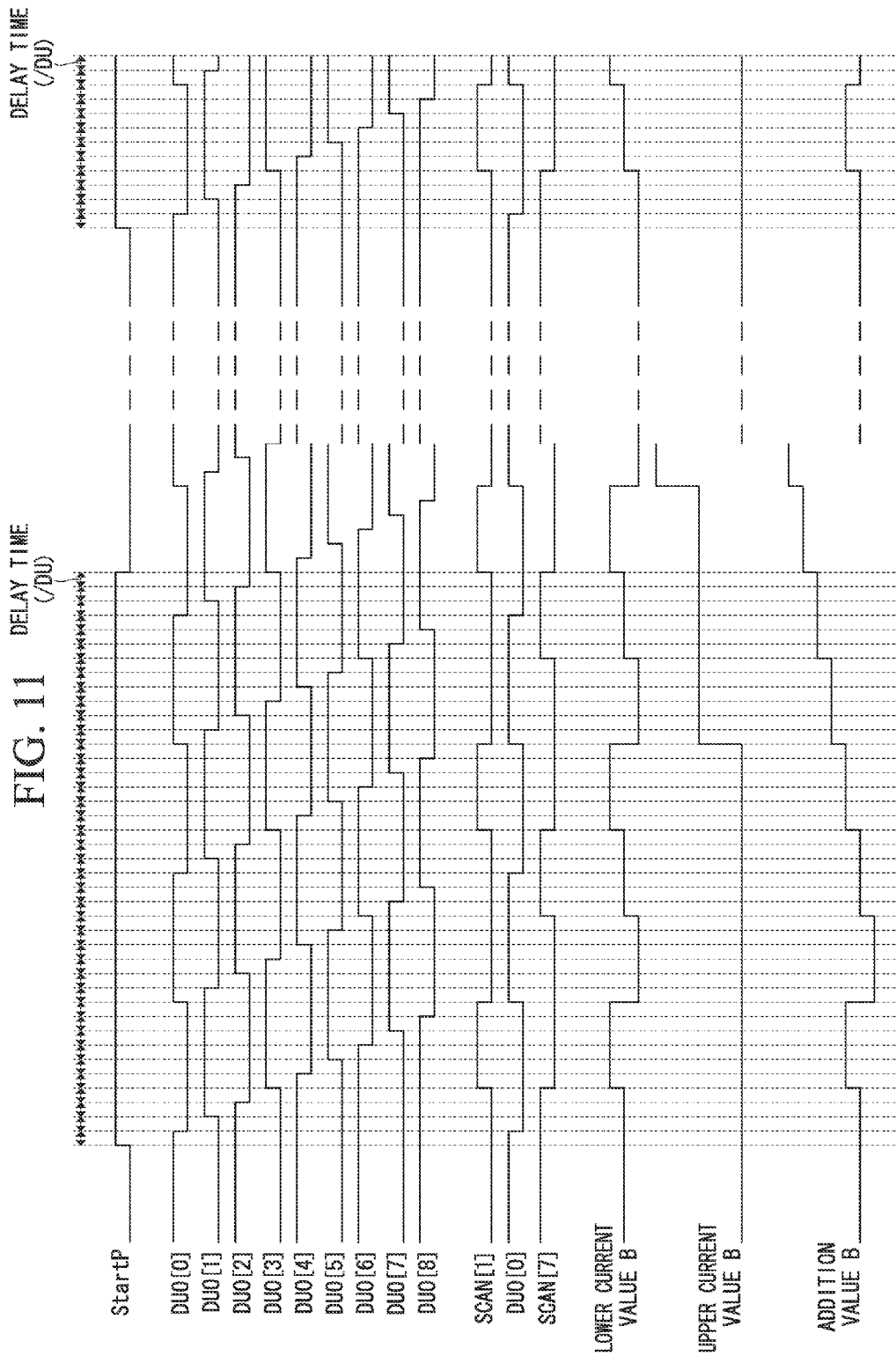
FIG. 11 is a timing chart illustrating an operation of the ramp wave generation circuit according to the second embodiment of the present invention.

FIG. 11 illustrates the signals DUO[0] to DUO[8] output by the pulse output unit 10, the signals SCAN[1] and SCAN[7] for selection of the lower current source cell of the lower current source cell part 12 in the second functional circuit, the signal DUO[0] for selection of the upper current source cell of the upper current source cell part 11b in the second functional circuit, a lower current value B generated by the lower current source cell part 12 in the second functional circuit, an upper current value B generated by the upper current source cell part 11b in the second functional circuit, and an addition value B that is a sum of the lower current value B and the upper current value B.

Figure 12:
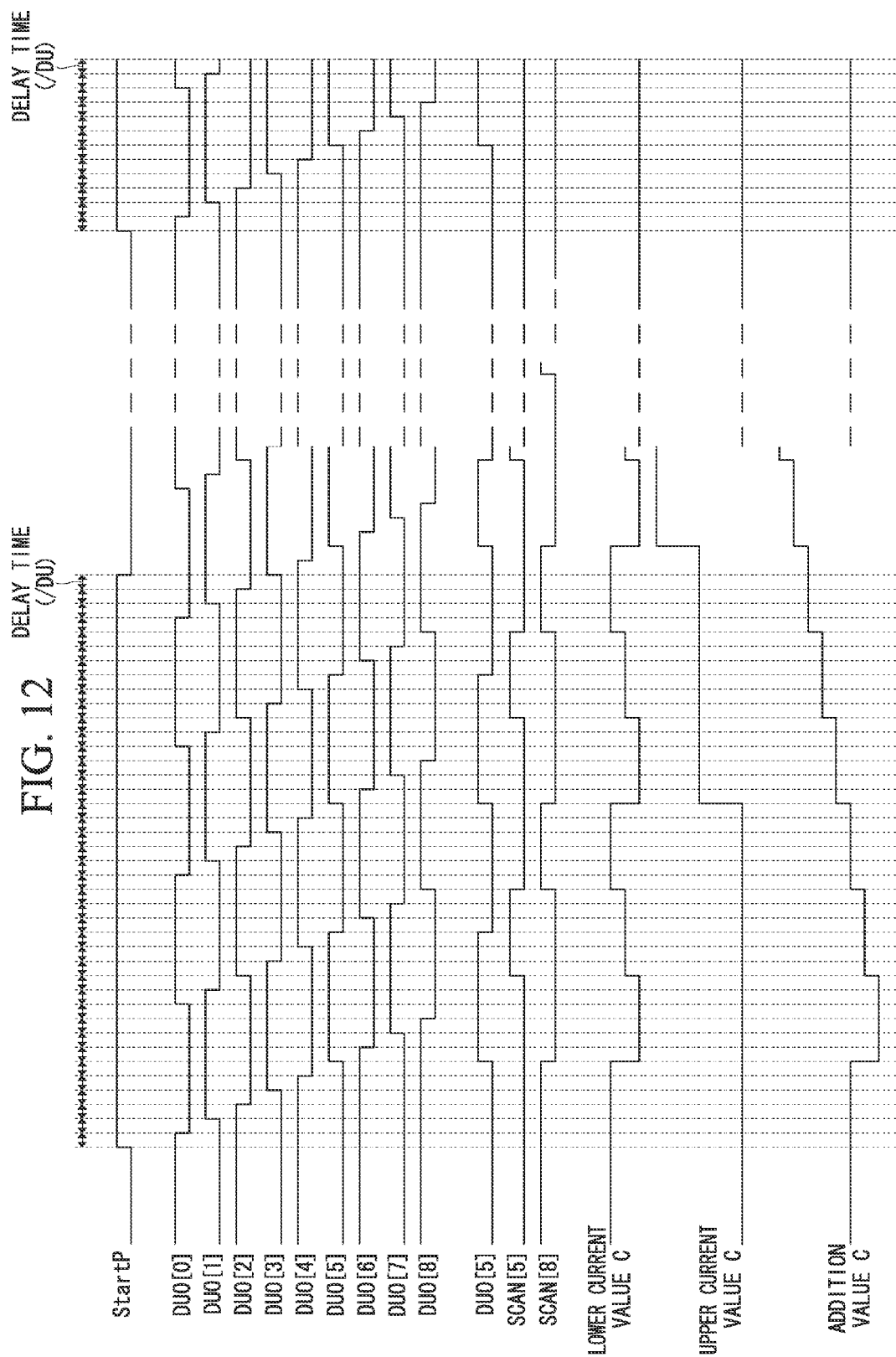
FIG. 12 is a timing chart illustrating an operation of the ramp wave generation circuit according to the second embodiment of the present invention.

FIG. 12 illustrates the signals DUO[0] to DUO[8] output by the pulse output unit 10, the signals SCAN[5] and SCAN[8] for selection of the lower current source cell of the lower current source cell part 12 in the third functional circuit, the signal DUO[5] for selection of the upper current source cell of the upper current source cell part 11c in the third functional circuit, a lower current value C generated by the lower current source cell part 12 in the third functional circuit, an upper current value C generated by the upper current source cell part 11c in the third functional circuit, and an addition value C that is a sum of the lower current value C and the upper current value C.

First, as a logic state of a start pulse (=StartP) is changed from an L state to a H state, the delay unit DU[*] (* is 0 to 8) in the pulse output unit 10 starts a transition operation. Logic states of the signal DUO[*] (* is 0 to 8) output from the pulse output unit are sequentially changed according to the transition operation of the delay unit DU[*]. Each signal DUO[*] is input to the corresponding functional circuit.

The first to third functional circuits operate in synchronization with the signal DUO[*] output from the pulse output unit 10. Hereinafter, an operation of each functional circuit will be described. Hereinafter, for simplicity of description, it is assumed that a current value output by one upper current source cell is 1, and current values output by one lower current source cell (two types) are ⅓ and ⅔.

In the first functional circuit, the lower current source cell of the lower current source cell part 12 is selected at a timing at which the signals SCAN[0] and SCAN[3] output by the first lower bit selection part SA of the lower bit selection part 14 are changed from being in the L state to being in the H state, and a lower current value A corresponding to the selected lower current source cell is output. Further, in the first functional circuit, the upper current source cell of the upper current source cell part 11a is selected at a timing at which the signal DUO[4] input to the upper bit selection part 13a is changed from being in the L state to being in the H state, and the upper current value A corresponding to the selected upper current source cell is output.

A concrete operation for selection of the lower current source cell in the first functional circuit is as follows. The signal SCAN[0] is changed from being in the L state to being in the H state at a timing at which the signal DUO[1] is changed from being in the L state to being in the H state. Accordingly, the lower current source cell that outputs the current value of ⅓ is selected, and the lower current value A increases by ⅓. Then, at a timing at which the signal DUO[7] is changed from being in the L state to being in the H state, the signal SCAN[0] is changed from being in the H state to being in the L state and the signal SCAN[3] is changed from being in the L state to being in the H state. Accordingly, the lower current source cell that outputs the current value of ⅓ is not selected, the lower current source cell that outputs the current value of ⅔ is selected, and the lower current value A increases by ⅓. Then, the signal SCAN[3] is changed from being in the H state to being in the L state at a timing at which the signal DUO[4] is changed from being in the L state to being in the H state. Accordingly, the lower current source cell that outputs the current value of ⅔ is not selected, and the lower current value A becomes 0. As this operation is repeatedly performed, the selection of the lower current source cell is performed.

A concrete operation for selection of the upper current source cell in the first functional circuit is as follows. The shift control part 131a of the upper bit selection part 13a generates a shift clock based on a change in the signal DUO[4] at a timing at which the signal DUO[4] is changed from being in the L state to being in the H state. The shift register part 130a of the upper bit selection part 13a performs one-stage shift based on the shift clock. Accordingly, the upper current source cell is selected, and the upper current value A increases by 1. Thereafter, similarly, at a timing at which the signal DUO[4] is changed from being in the L state to being in the H state, the upper current source cell is selected and the upper current value A increases by 1. As this operation is repeatedly performed, the selection of the upper current source cell is performed. According to the above operation, the addition value A increases in increments of ⅓.

In the second functional circuit, the lower current source cell of the lower current source cell part 12 is selected at a timing at which the signals SCAN[7] and SCAN[1] output by the second lower bit selection part SB of the lower bit selection part 14 are changed from being in the L state to being in the H state, and the lower current value B corresponding to the selected lower current source cell is output. Further, in the second functional circuit, the upper current source cell of the upper current source cell part 11b is selected at a timing at which the signal DUO[0] input to the upper bit selection part 13b is changed from being in the L state to being in the H state, and the upper current value B corresponding to the selected upper current source cell is output.

A concrete operation for selection of the lower current source cell in the second functional circuit is as follows. The signal SCAN[7] is changed from being in the L state to being in the H state at a timing at which the signal DUO[6] is changed from being in the L state to being in the H state. Accordingly, the lower current source cell that outputs the current value of ⅓ is selected, and the lower current value B increases by ⅓. Then, at a timing at which the signal DUO[3] is changed from being in the L state to being in the H state, the signal SCAN[7] is changed from being in the H state to being in the L state and the signal SCAN[1] is changed from being in the L state to being in the H state. Accordingly, the lower current source cell that outputs the current value of ⅓ is not selected, the lower current source cell that outputs the current value of ⅔ is selected, and the lower current value B increases by ⅓. Then, the signal SCAN[1] is changed from being in the H state to being in the L state at a timing at which the signal DUO[0] is changed from being in the L state to being in the H state. Accordingly, the lower current source cell that outputs the current value of ⅔ is not selected, and the lower current value B becomes 0. As this operation is repeatedly performed, the selection of the lower current source cell is performed.

A concrete operation for selection of the upper current source cell in the second functional circuit is as follows. The shift control part 131b of the upper bit selection part 13b generates a shift clock based on a change in the signal DUO[0] at a timing at which the signal DUO[0] is changed from being in the L state to being in the H state. The shift register part 130b of the upper bit selection part 13b performs one-stage shift based on the shift clock. Accordingly, the upper current source cell is selected, and the upper current value B increases by 1. Thereafter, similarly, at a timing at which the signal DUO[0] is changed from being in the L state to being in the H state, the upper current source cell is selected and the upper current value B increases by 1. As this operation is repeatedly performed, the selection of the upper current source cell is performed. According to the above operation, the addition value B increases in increments of ⅓.

In the third functional circuit, the lower current source cell of the lower current source cell part 12 is selected at a timing at which the signals SCAN[5] and SCAN[8] output by the third lower bit selection part SC of the lower bit selection part 14 are changed from being in the L state to being in the H state, and the lower current value C corresponding to the selected lower current source cell is output. Further, in the third functional circuit, the upper current source cell of the upper current source cell part 11c is selected at a timing at which the signal DUO[5] input to the upper bit selection part 13c is changed from being in the L state to being in the H state, and the upper current value C corresponding to the selected upper current source cell is output.

A concrete operation for selection of the lower current source cell in the third functional circuit is as follows. The signal SCAN[5] is changed from being in the L state to being in the H state at a timing at which the signal DUO[2] is changed from being in the L state to being in the H state. Accordingly, the lower current source cell that outputs the current value of ⅓ is selected, and the lower current value C increases by ⅓. Then, at a timing at which the signal DUO[8] is changed from being in the L state to being in the H state, the signal SCAN[5] is changed from being in the H state to being in the L state, and the signal SCAN[8] is changed from being in the L state to being in the H state. Accordingly, the lower current source cell that outputs the current value of ⅓ is not selected, the lower current source cell that outputs the current value of ⅔ is selected, and the lower current value C increases by ⅓. Then, the signal SCAN[8] is changed from being in the H state to being in the L state at a timing at which the signal DUO[5] is changed from being in the L state to being in the H state. Accordingly, the lower current source cell that outputs the current value of ⅔ is not selected, and the lower current value C becomes 0. As this operation is repeatedly performed, the selection of the lower current source cell is performed.

A concrete operation for selection of an upper current source cell in the third functional circuit is as follows. The shift control part 131c of the upper bit selection part 13c generates a shift clock based on a change in the signal DUO [5] at a timing at which the signal DUO[5] is changed from being in the L state to being in the H state. The shift register part 130c of the upper bit selection part 13c performs one-stage shift based on the shift clock. Accordingly, the upper current source cell is selected and the upper current value C increases by 1. Thereafter, similarly, at a timing at which the signal DUO[5] is changed from being in the L state to being in the H state, the upper current source cell is selected and the upper current value C increases by 1. As this operation is repeatedly performed, the selection of the upper current source cell is performed. According to the above operation, the addition value C increases in increments of ⅓.

The constant currents output from the respective functional circuits are added by the addition part 15 (the addition value A+the addition value B+the addition value C) and converted into a voltage by the conversion part 16. An addition value that is a sum of the addition value A, the addition value B, and the addition value C increases in increments of ⅓ (see FIG. 13).

Figure 13:
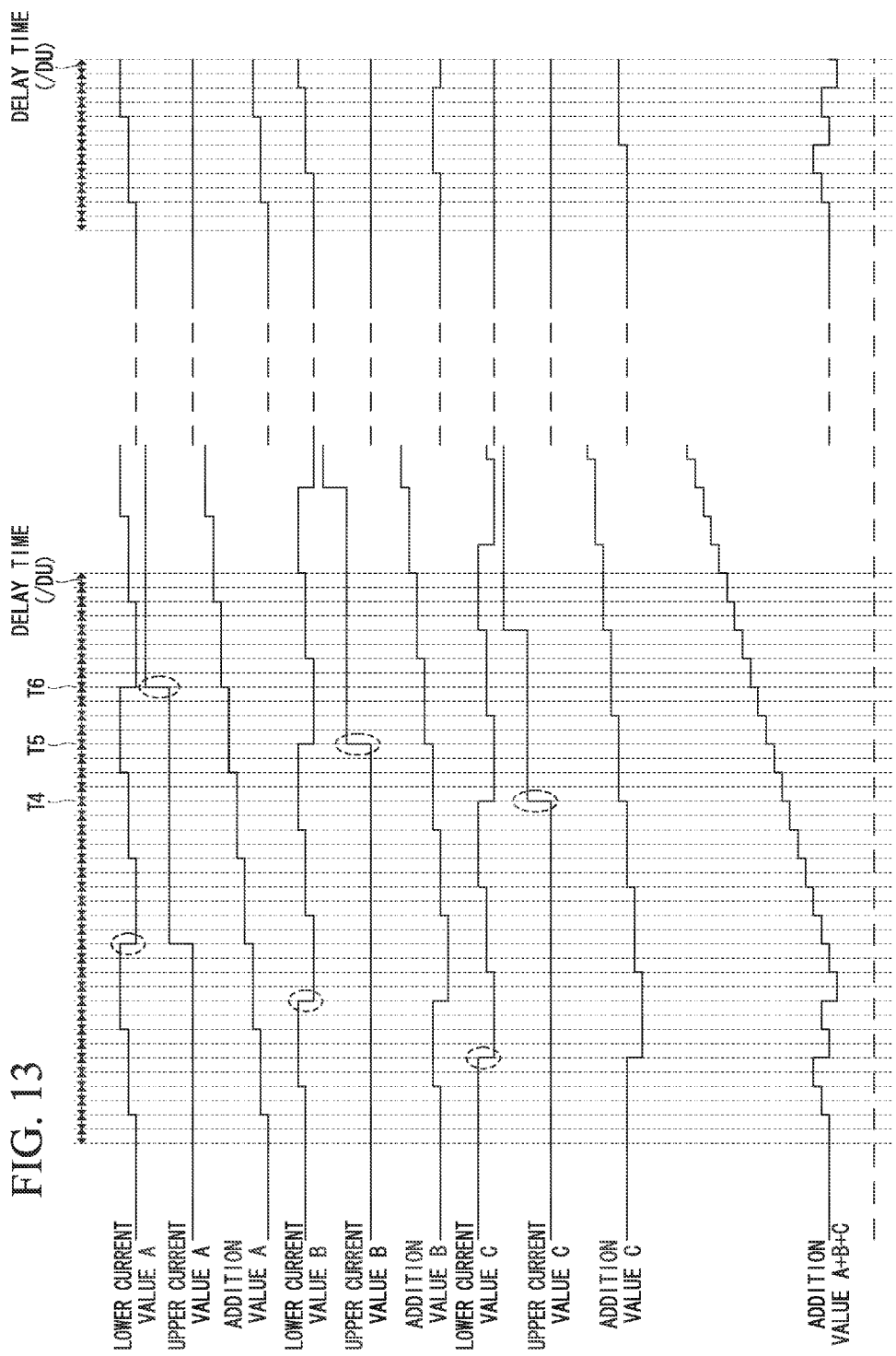
FIG. 13 is a timing chart illustrating an operation of the ramp wave generation circuit according to the second embodiment of the present invention.

As illustrated in FIG. 13, the lower current value B is changed at a timing at which a delay time of the delay units corresponding to four stages has elapsed from a timing at which the lower current value C is changed, and the lower current value A is changed at a timing at which the delay time of the delay units corresponding to the four stages has elapsed from a timing at which the lower current value B is changed. Further, in the present example, a timing at which each lower current value becomes 0 is used as a reference. Similarly, the upper current value B is changed at a timing at which the delay time of the delay units corresponding to the four stages has elapsed from a timing at which the upper current value C is changed, and the upper current value A is changed at a timing at which the delay time of the delay units corresponding to the four stages has elapsed from a timing at which the upper current value B is changed. Further, in the present example, a timing at which each upper current value increases is used as a reference.

In other words, the selection/non-selection of the lower current source cell and the upper current source cell by the second lower bit selection part SB and the upper bit selection part 13b in the second functional circuit is performed at a timing at which a certain time (in the case of the present example, the delay time of the delay units corresponding to the four stages) has elapsed from a timing for selection/non-selection of the lower current source cell and the upper current source cell by the third lower bit selection part SC and the upper bit selection part 13c of the third functional circuit. The timing of selection/non-selection by the lower current source cell and the upper current source cell is similar to the second functional circuit and the first functional circuit. Accordingly, the first to third functional circuits operate in synchronization with the signal output from the pulse output unit 10, and the timings for selection/non-selection of the lower current source cell and the upper current source cell by the respective functional circuits have a certain time difference.

As described above, according to the present embodiment, it is unnecessary to shape the driving clock and it may easily realize a high-speed operation of each functional circuit. It may generate a stable ramp wave whose voltage is changed at a predetermined time interval and to suppress a glitch from being generated or code from being missed by operating the respective functional circuits with a certain time difference. It may suppress a discrepancy of timings of the selection/non-selection of the lower current source cell and the selection of the upper current source cell and suppress generation of a glitch. It may realize a high-speed solid-state imaging device by providing the ramp wave generation circuit, for example, in place of the ramp wave generation circuit 7 of FIG. 20.

Further, according to the present embodiment, the following effects are obtained. In the first embodiment, as illustrated in FIG. 8, in timings T1, T2 and T3 at which the selection/non-selection of the lower current source cell and the selection of the upper current source cell are simultaneously performed, a time difference between the timing T1 and the timing T2 and a time difference between the timing T2 and the timing T3 are a delay time of the delay units corresponding to two stages. On the other hand, in the second embodiment, as illustrated in FIG. 13, in timings T4, T5 and T6 at which the selection/non-selection of the lower current source cell and the selection of the upper current source cell are simultaneously performed, a time difference between the timing T4 and the timing T5 and a time difference between the timing T5 and the timing T6 are a delay time of the delay units corresponding to four stages.

As described above, at the timing at which the selection/non-selection of the lower current source cell and the selection of the upper current source cell are simultaneously performed, a glitch is easily generated due to the difference in timing between the selection/non-selection of the lower current source cell and the selection of the upper current source cell. Accordingly, it is preferable to disperse, in terms of time, influence of the glitch on the generated ramp wave by dispersing, in terms of time, the timing at which the selection/non-selection of the lower current source cell and the selection of the upper current source cell are simultaneously performed. In the second embodiment, since the timings at which the selection/non-selection of the lower current source cell and the selection of the upper current source cell are simultaneously performed can be dispersed in terms of time, a stable ramp wave can be generated, as compared to the first embodiment.

Third Embodiment

Figure 14:
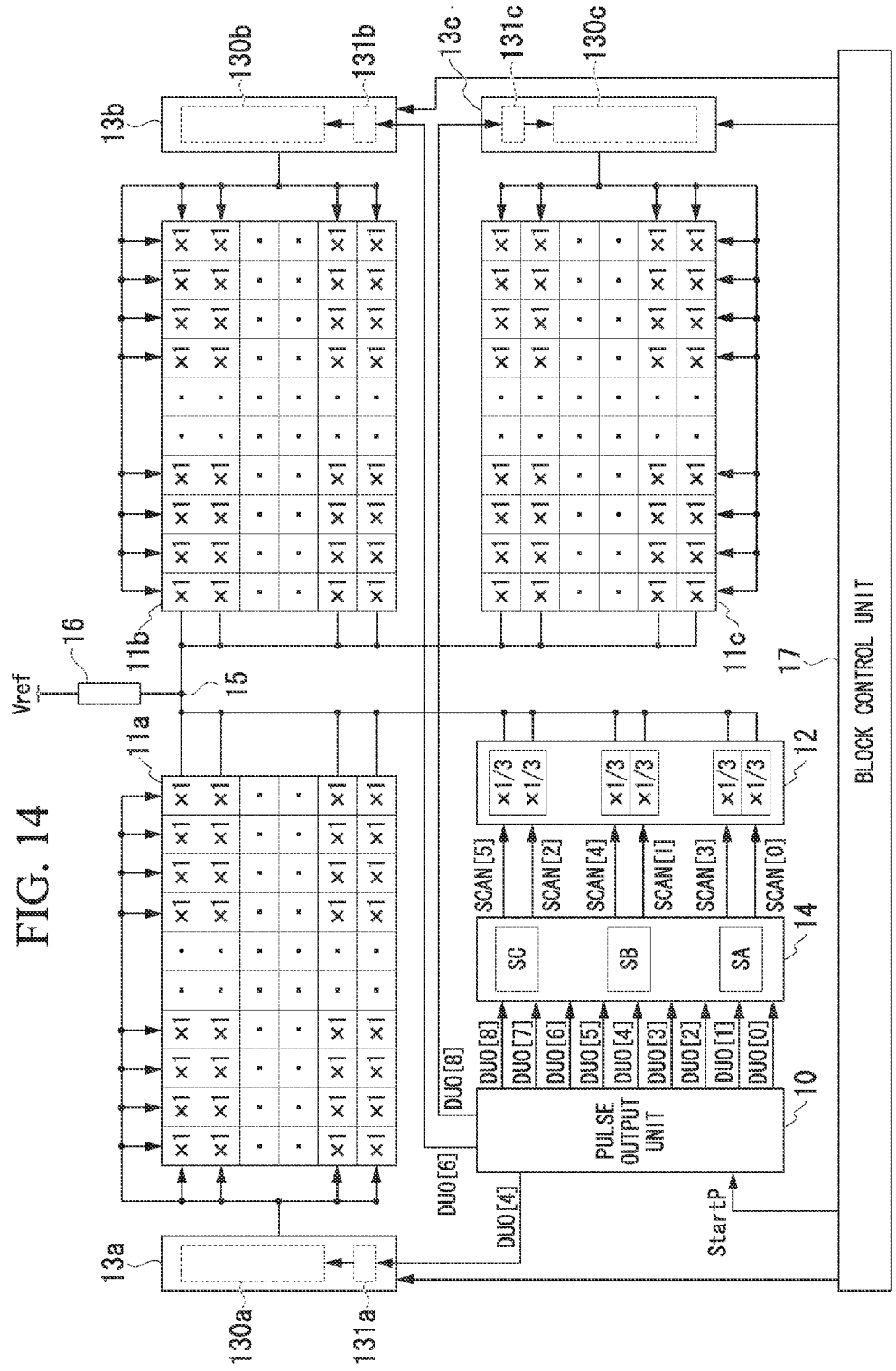
FIG. 14 is a block diagram illustrating a configuration of a ramp wave generation circuit according to a third embodiment of the present invention.

Next, a third embodiment of the present invention will be described. FIG. 14 illustrates one example of a configuration of a ramp wave generation circuit according to the present embodiment. Since the ramp wave generation circuit is similar to the ramp wave generation circuit illustrated in FIG. 1 except that a plurality of lower current source cells (cells described as "×⅓" in FIG. 14) each generating a current value that is ⅓ of a current value of a constant current generated by the individual upper current source cells in upper current source cell parts 11a, 11b and 11c are provided in a lower current source cell part 12 and except for a configuration of lower bit selection part 14, a description thereof will be omitted here.

Figure 15:
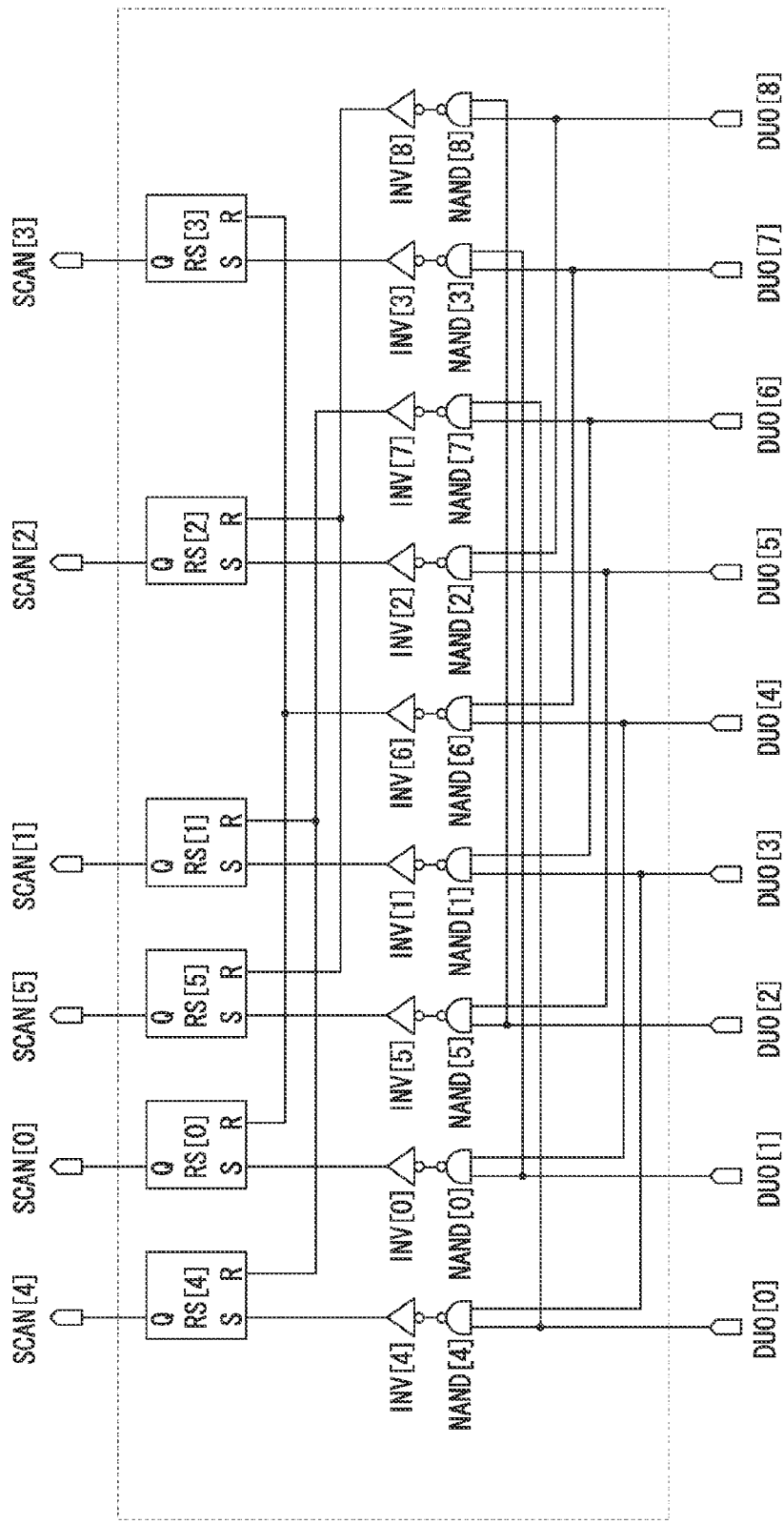
FIG. 15 is a circuit diagram illustrating a configuration of the lower bit selection part included in the ramp wave generation circuit according to the third embodiment of the present invention.

FIG. 15 illustrates a detailed configuration of the lower bit selection part 14. The lower bit selection part 14 generates and outputs a pulse signal having a predetermined logic at a predetermined timing by performing a logical operation on signals output from a plurality of delay units DU[*] included in a pulse output unit 10. The lower bit selection part 14 includes an inverter circuit INV[*] (* is 0 to 8), a NAND circuit NAND[*] (* is 0 to 8), and an RS latch circuit RS[*] (* is 0 to 5).

A signal output from a predetermined delay unit is input to one input terminal of the NAND circuit NAND[*], and a signal output from the delay unit three stages before the predetermined delay unit is input to the other input terminal of the NAND circuit NAND[*]. A signal output from the NAND circuit NAND[*] is inverted by the inverter circuit INV[*] to obtain a desired logic, and is output to an S terminal or an R terminal of the RS latch RS[*].

The NAND circuits NAND[0], NAND[3] and NAND[6], the inverter circuits INV[0], INV[3], and INV[6], and the RS latches RS[0] and RS[3] correspond to a first lower bit selection part SA of FIG. 14, and the NAND circuits NAND[1], NAND[4] and NAND[7], the inverter circuits INV[1], INV[4] and INV[7], and the RS latches RS[1] and RS[4] correspond to a second lower bit selection part SB of FIG. 14, and the NAND circuits NAND[2], NAND[5], and NAND[8], the inverter circuits INV[2], INV[5] and INV[8], and the RS latches RS[2] and RS[5] correspond to a third lower bit selection part SC in FIG. 14. Further, this configuration is one example and the present invention is not limited thereto.

Figure 16:
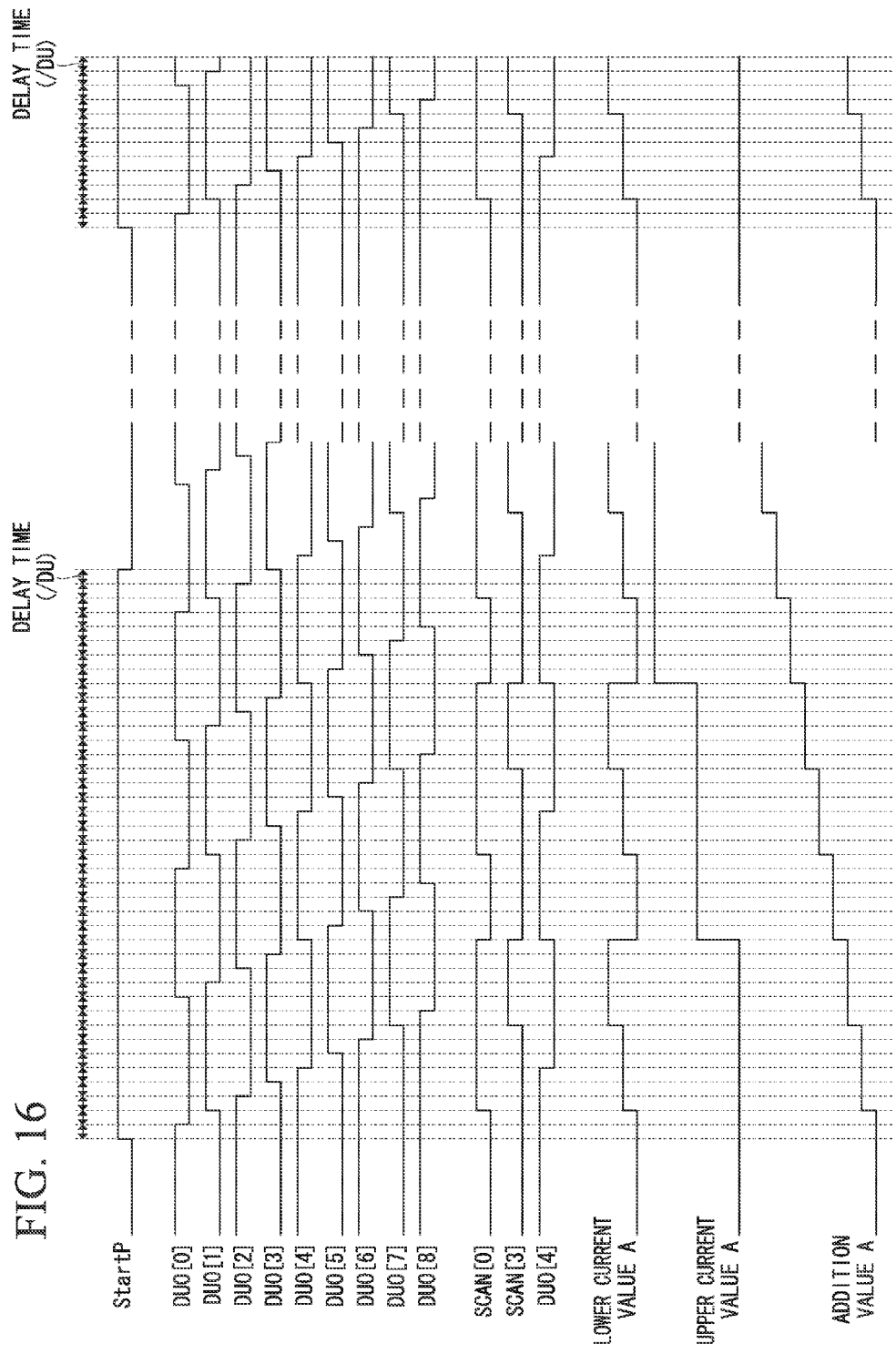
FIG. 16 is a timing chart illustrating an operation of the ramp wave generation circuit according to the third embodiment of the present invention.

Next, an operation of the ramp wave generation circuit will be described. FIG. 16 illustrates signals DUO[0] to DUO[8] output by a pulse output unit 10, signals SCAN[0] and SCAN[3] for selection of the lower current source cell of the lower current source cell part 12 in a first functional circuit, a signal DUO[4] for selection of the upper current source cell of the upper current source cell part 11a in the first functional circuit, a lower current value A generated by the lower current source cell part 12 in the first functional circuit, an upper current value A generated by the upper current source cell part 11a in the first functional circuit, and an addition value A that is a sum of the lower current value A and the upper current value A.

Figure 17:
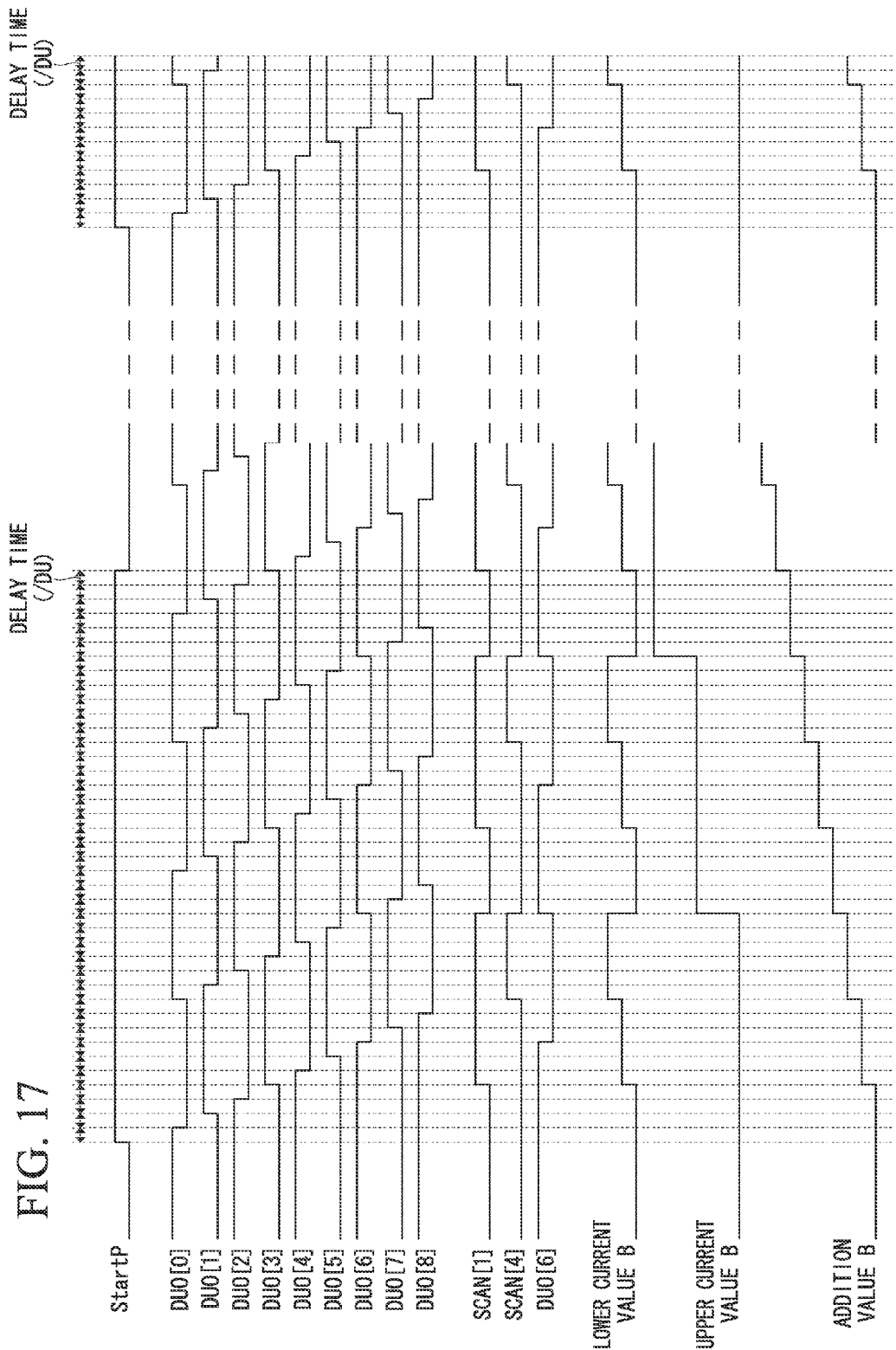
FIG. 17 is a timing chart illustrating an operation of the ramp wave generation circuit according to the third embodiment of the present invention.

FIG. 17 illustrates the signals DUO[0] to DUO[8] output by the pulse output unit 10, signals SCAN[1] and SCAN[4] for selection of the lower current source cell of the lower current source cell part 12 in a second functional circuit, a signal DUO[6] for the selection of the upper current source cell of the upper current source cell part 11b in the second functional circuit, a lower current value B generated by the lower current source cell part 12 in the second functional circuit, an upper current value B generated by the upper current source cell part 11b in the second functional circuit, and an addition value B that is a sum of the lower current value B and the upper current value B.

Figure 18:
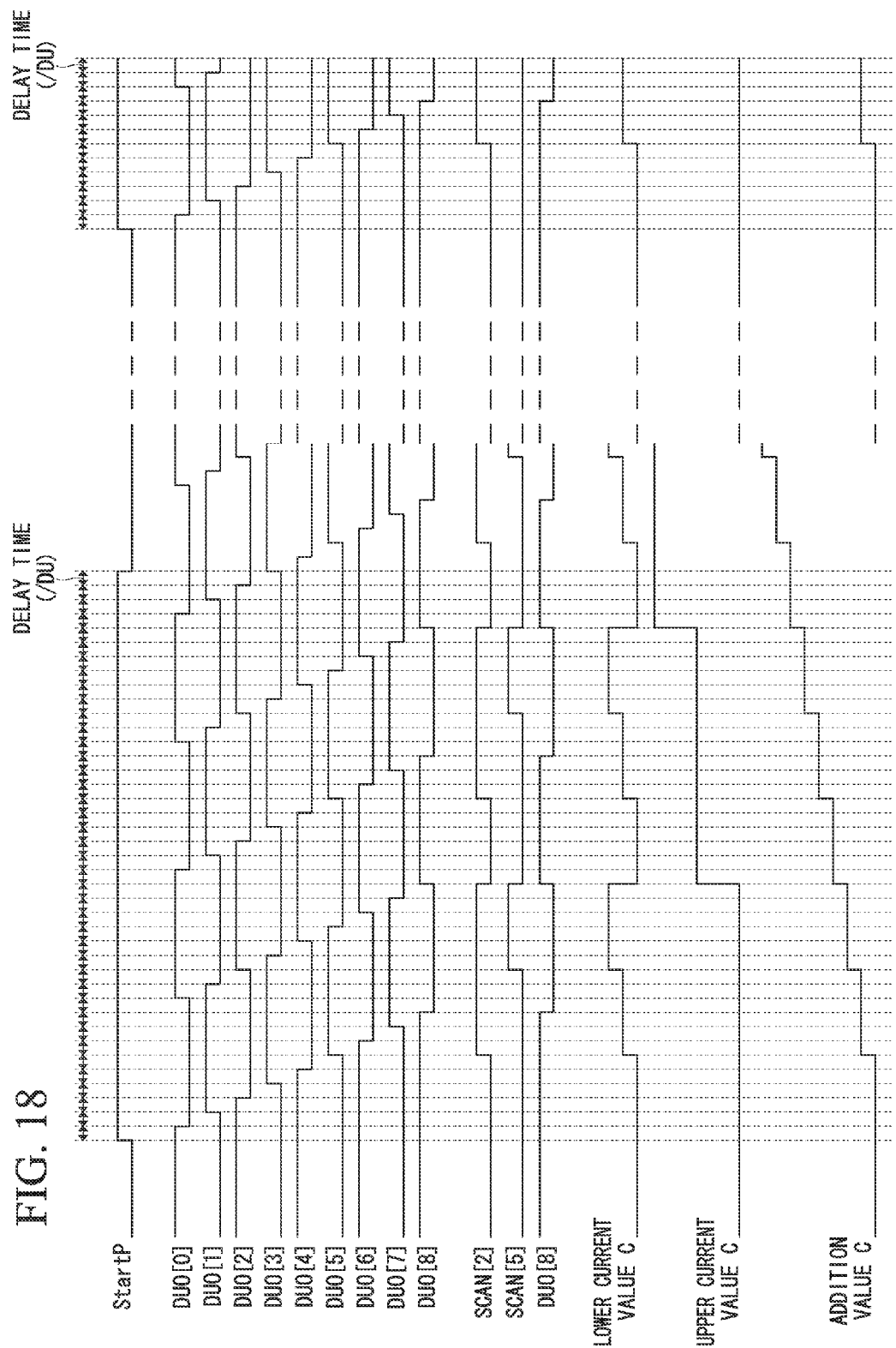
FIG. 18 is a timing chart illustrating an operation of the ramp wave generation circuit according to the third embodiment of the present invention.

FIG. 18 illustrates the signals DUO[0] to DUO[8] output by the pulse output unit 10, signals SCAN[2] and SCAN[5] for selection of the lower current source cell of the lower current source cell part 12 in a third functional circuit, a signal DUO[8] for selection of the upper current source cell of the upper current source cell part 11c in the third functional circuit, a lower current value C generated by the lower current source cell part 12 in the third functional circuit, an upper current value C generated by the upper current source cell part 11c in the third functional circuit, and an addition value C that is a sum of the lower current value C and the upper current value C.

First, as a logic state of a start pulse (=StartP) is changed from an L state to an H state, the delay unit DU[*] (* is 0 to 8) in the pulse output unit 10 starts a transition operation. According to the transition operation of the delay unit DU[*], logic states of the signal DUO[*] (* is 0 to 8) output from the pulse output unit are sequentially changed. Each signal DUO[*] is input to the corresponding functional circuit.

The first to third functional circuits operate in synchronization with the signal DUO[*] output from the pulse output unit 10. Hereinafter, an operation of each functional circuit will be described. Hereinafter, for simplicity of description, it is assumed that a current value output by one upper current source cell is 1, and a current value output by one lower current source cell is ⅓.

In the first functional circuit, the lower current source cell of the lower current source cell part 12 is selected at a timing at which the signals SCAN[0] and SCAN[3] output by the first lower bit selection part SA of the lower bit selection part 14 are changed from being in the L state to being in the H state, and the lower current value A corresponding to the selected lower current source cell is output. Further, in the first functional circuit, the upper current source cell of the upper current source cell part 11a is selected at a timing at which the signal DUO[4] input to the upper bit selection part 13a is changed from being in the L state to being in the H state, and the upper current value A corresponding to the selected upper current source cell is output.

A concrete operation for selection of the lower current source cell in the first functional circuit is as follows. The signal SCAN[0] is changed from being in the L state to being in the H state at a timing at which the signal DUO[1] is changed from being in the L state to being in the H state. Accordingly, the lower current source cell that outputs the current value of ⅓ is selected, and the lower current value A increases by ⅓. Then, the signal SCAN[3] is changed from being in the L state to being in the H state at a timing at which the signal DUO[7] is changed from being in the L state to being in the H state. Accordingly, the lower current source cell that outputs the current value of ⅓ is selected, and the lower current value A increases by ⅓. Then, the signals SCAN[0] and SCAN[3] are changed from being in the H state to being in the L state at a timing at which the signal DUO[4] is changed from being in the L state to being in the H state. Accordingly, the two lower current source cells that output the current value of ⅓ are not selected, and the lower current value A becomes 0. As this operation is repeatedly performed, the selection of the lower current source cell is performed.

A concrete operation for selection of the upper current source cell in the first functional circuit is as follows. A shift control part 131a of the upper bit selection part 13a generates a shift clock based on a change in the signal DUO[4] at a timing at which the signal DUO[4] is changed from being in the L state to being in the H state. A shift register part 130a of the upper bit selection part 13a performs one-stage shift based on the shift clock. Accordingly, the upper current source cell is selected and the upper current value A increases by 1. Thereafter, similarly, the upper current source cell is selected at a timing at which the signal DUO[4] is changed from being in the L state to being in the H state, and the upper current value A increases by 1. As this operation is repeatedly performed, the selection of the upper current source cell is performed. According to the above operation, the addition value A increases in increments of ⅓.

In the second functional circuit, the lower current source cell of the lower current source cell part 12 is selected at a timing at which the signals SCAN[1] and SCAN[4] output by the second lower bit selection part SB of the lower bit selection part 14 are changed from being in the L state to being in the H state, and the lower current value B corresponding to the selected lower current source cell is output. Further, in the second functional circuit, the upper current source cell of the upper current source cell part 11b is selected at a timing at which the signal DUO[6] input to the upper bit selection part 13b is changed from being in the L state to being in the H state, and the upper current value B corresponding to the selected upper current source cell is output.

A concrete operation for selection of the lower current source cell in the second functional circuit is as follows. The signal SCAN[1] is changed from being in the L state to being in the H state at a timing at which the signal DUO[3] is changed from being in the L state to being in the H state. Accordingly, the lower current source cell that outputs the current value of ⅓ is selected, and the lower current value B increases by ⅓. Then, the signal SCAN[4] is changed from being in the L state to being in the H state at a timing at which the signal DUO[0] is changed from being in the L state to being in the H state. Accordingly, the lower current source cell that outputs the current value of ⅓ is selected, and the lower current value B increases by ⅓. Then, the signals SCAN[1] and SCAN[4] are changed from being in the H state to being in the L state at a timing at which the signal DUO[6] is changed from being in the L state to being in the H state. Accordingly, the two lower current source cells that output the current value of ⅓ are not selected, and the lower current value B becomes 0. As this operation is repeatedly performed, the selection of the lower current source cell is performed.

A concrete operation for selection of the upper current source cell in the second functional circuit is as follows. A shift control part 131b of the upper bit selection part 13b generates a shift clock based on a change in the signal DUO[6] at a timing at which the signal DUO[6] is changed from being in the L state to being in the H state. A shift register part 130b of the upper bit selection part 13b performs one-stage shift based on the shift clock. Accordingly, the upper current source cell is selected, and the upper current value B increases by 1. Thereafter, similarly, the upper current source cell is selected at a timing at which the signal DUO[6] is changed from being in the L state to being in the H state, and the upper current value B increases by 1. As this operation is repeatedly performed, the selection of the upper current source cell is performed. According to the above operation, the addition value B increases in increments of ⅓.

In the third functional circuit, the lower current source cell of the lower current source cell part 12 is selected at a timing at which the signals SCAN[2] and SCAN[5] output by the third lower bit selection part SC of the lower bit selection part 14 are changed from being in the L state to being in the H state, and the lower current value C corresponding to the selected lower current source cell is output. Further, in the third functional circuit, the upper current source cell of the upper current source cell part 11c is selected at a timing at which the signal DUO[8] input to the upper bit selection part 13c is changed from being in the L state to being in the H state, and the upper current value C corresponding to the selected upper current source cell is output.

A concrete operation for selection of the lower current source cell in the third functional circuit is as follows. The signal SCAN[2] is changed from being in the L state to being in the H state at a timing at which the signal DUO[5] is changed from being in the L state to being in the H state. Accordingly, the lower current source cell that outputs the current value of ⅓ is selected, and the lower current value C increases by ⅓. Then, the signal SCAN[5] is changed from being in the L state to being in the H state at a timing at which the signal DUO[2] is changed from being in the L state to being in the H state. Accordingly, the lower current source cell that outputs the current value of ⅓ is selected, and the lower current value C increases by ⅓. Then, the signals SCAN[2] and SCAN[5] are changed from being in the H state to being in the L state at a timing at which the signal DUO[8] is changed from being in the L state to being in the H state. Accordingly, the two lower current source cells that output the current value of ⅓ are not selected, and the lower current value C becomes 0. As this operation is repeatedly performed, the selection of the lower current source cell is performed.

A concrete operation for selection of the upper current source cell in the third functional circuit is as follows. A shift control part 131c of the upper bit selection part 13c generates a shift clock based on a change in the signal DUO[8] at a timing at which the signal DUO[8] is changed from being in the L state to being in the H state. A shift register part 130c of the upper bit selection part 13c performs one-stage shift based on the shift clock. Accordingly, the upper current source cell is selected, and the upper current value C increases by 1. Thereafter, similarly, the upper current source cell is selected at a timing at which the signal DUO[8] is changed from being in the L state to being in the H state, and the upper current value C increases by 1. As this operation is repeatedly performed, the selection of the upper current source cell is performed. According to the above operation, the addition value C increases in increments of ⅓.

The constant currents output from the respective functional circuits are added by the addition part 15 (the addition value A+the addition value B+the addition value C), and converted into a voltage by the conversion part 16. The addition value that is a sum of the addition value A, the addition value B, and the addition value C increases in increments of ⅓ (see FIG. 19).

Figure 19:
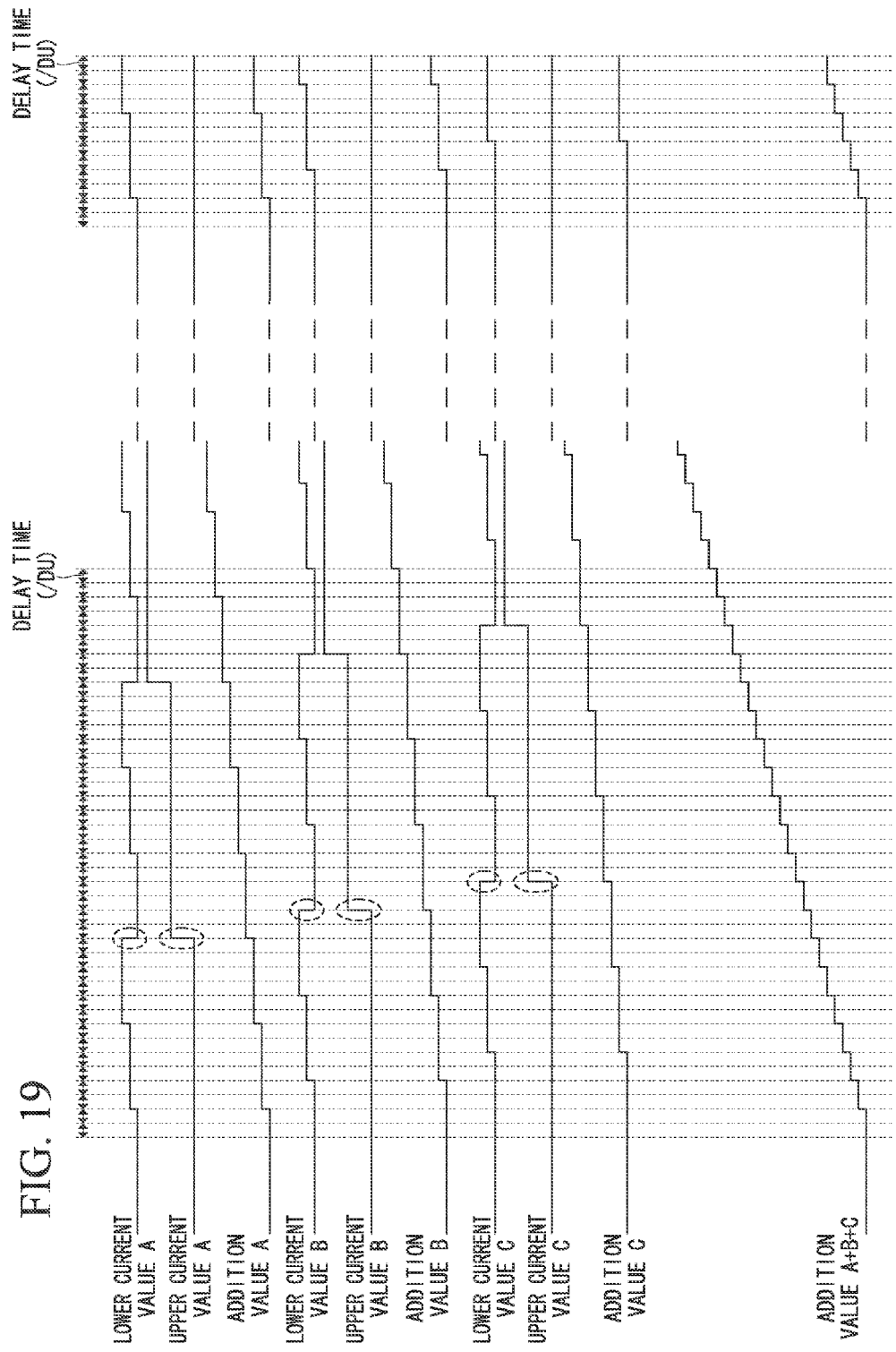
FIG. 19 is a timing chart illustrating an operation of the ramp wave generation circuit according to the third embodiment of the present invention.

As illustrated in FIG. 19, the lower current value B is changed at a timing at which a delay time of the delay units corresponding to two stages has elapsed from a timing at which the lower current value A is changed, and the lower current value C is changed at a timing at which the delay time of the delay units corresponding to two stages has elapsed from a timing at which the lower current value B is changed. Further, in the present example, a timing at which each lower current value becomes 0 is used as a reference. Similarly, the upper current value B is changed at a timing at which the delay time of the delay units corresponding to two stages has elapsed from a timing at which the upper current value A is changed, and the upper current value C is changed at a timing at which the delay time of the delay units corresponding to two stages has elapsed from a timing at which the upper current value B is changed. Further, in the present example, a timing at which each upper current value increases is used as a reference.

In other words, the selection/non-selection of the lower current source cell and the upper current source cell by the second lower bit selection part SB and the upper bit selection part 13b in the second functional circuit is performed at a timing at which a certain time (in the case of the present example, the delay time of the delay units corresponding to two stages) has elapsed from a timing for selection/non-selection of the lower current source cell and the upper current source cell by the first lower bit selection part SA and the upper bit selection part 13a in the first functional circuit. The timing of selection/non-selection of the lower current source cell and the upper current source cell is similar in the second functional circuit and the third functional circuit. Accordingly, the first to third functional circuits operate in synchronization with the signal output from the pulse output unit 10 and the timings for selection/non-selection of the lower current source cell and the upper current source cell by the respective functional circuits have a certain time difference.

As described above, according to the present embodiment, it is unnecessary to shape the driving clock and it is possible to easily realize a high-speed operation of each functional circuit. Further, as the respective functional circuits operate with a certain time difference, it is possible to generate a stable ramp wave whose voltage is changed at a predetermined time interval and to suppress a glitch from being generated or code from being missed. Further, it is possible to suppress a discrepancy of timings of the selection/non-selection of the lower current source cell and the selection of the upper current source cell and to suppress generation of a glitch. Further, it is possible to realize a high-speed solid-state imaging device by providing the ramp wave generation circuit, for example, in place of the ramp wave generation circuit 7 of FIG. 20.

While the preferred embodiments of the present invention have been described above, the present invention is not limited to the embodiments. Addition, omission, and substitution, and other changes of the configuration may be performed without departing from the scope and spirit of the present invention. The present invention is not limited by the above description, and is limited only by the claims.

What is claimed is:

1. A ramp wave generation circuit comprising:
    a pulse output unit including a delay part having a plurality of delay units that delay and output an input signal, and a delay control part controlling a delay time by which the delay unit delays a signal, wherein the pulse output unit outputs a plurality of signals having logic states corresponding to logic states of signals output by the delay units and a time corresponding to the delay time that a time difference between timings at which the logic states of the respective signals are changed is;
    m (m is a natural number greater than or equal to 2) functional circuits including an upper current source cell part having upper current source cells that generate a same constant current, a lower current source cell part having a plurality of lower current source cells weighted to generate a current value different by a predetermined percentage from a current value of the constant current generated by the upper current source cell, a lower bit selection part selecting the lower current source cell based on an output of the pulse output unit, and an upper bit selection part selecting the upper current source cell based on an output of the pulse output unit;
    an addition unit adding currents output from the m functional circuits; and
    a conversion unit converting an current added by the addition unit into a voltage and outputting the voltage,
    wherein a time difference between a timing of a selection operation of the lower bit selection part and the upper bit selection part had one functional circuit in the m functional circuits and a timing of a selection operation of the lower bit selection part and the upper bit selection part had the other functional circuit in the m functional circuits is a time corresponding to an integer times the delay time.

2. A ramp wave generation circuit comprising:
    a pulse output unit including a delay part having a plurality of delay units that delay and output an input signal, and a delay control part controlling a delay time by which the delay unit delays a signal, wherein the pulse output unit outputs a plurality of signals having logic states corresponding to logic states of signals output by the delay units and a time corresponding to the delay time that a time difference between timings at which the logic states of the respective signals are changed is;
    m (m is a natural number greater than or equal to 2) functional circuits including an upper current source cell part having upper current source cells that generate a same constant current, a lower current source cell part having a plurality of lower current source cells that generate a current value that is a predetermined percentage of a current value of the constant current generated by the upper current source cell, a lower bit selection part selecting the lower current source cell based on an output of the pulse output unit, and an upper bit selection part selecting the upper current source cell based on an output of the pulse output unit;
    an addition unit adding currents output from the m functional circuits; and
    a conversion unit converting an current added by the addition unit into a voltage and output the voltage,
    wherein a time difference between a timing of a selection operation of the lower bit selection part and the upper bit selection part had one functional circuit in the m functional circuits and a timing of a selection operation of the lower bit selection part and the upper bit selection part had the other functional circuit in the m functional circuits is a time corresponding to an integer times the delay time.

3. The ramp wave generation circuit according to claim 1 or 2, wherein:
    the delay part is a circular ring delay circuit in which the delay units are connected in a ring shape.

4. The ramp wave generation circuit according to claim 1 or 2, wherein:
    the upper bit selection part includes:
    a shift register part selecting the upper current source cell; and
    a shift control part generating a shift clock to be given to the shift register part based on the output of the pulse output unit.

5. A solid-state imaging device comprising:
    an imaging unit in which a plurality of pixels that output a pixel signal according to an amount of an incident electromagnetic wave are arranged in a matrix shape; and
    the ramp wave generation circuit according to claim 1 or 2.

* * * * *